US012647606B2

(12) United States Patent
Jang et al.

(10) Patent No.: US 12,647,606 B2
(45) Date of Patent: Jun. 2, 2026

(54) IMAGE ENCODING/DECODING METHOD, METHOD FOR TRANSMITTING BITSTREAM, AND RECORDING MEDIUM STORING BITSTREAM

(71) Applicant: LG ELECTRONICS INC., Seoul (KR)

(72) Inventors: Hyeong Moon Jang, Seoul (KR); Nae Ri Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/838,079

(22) PCT Filed: Feb. 15, 2023

(86) PCT No.: PCT/KR2023/002204
§ 371 (c)(1),
(2) Date: Aug. 13, 2024

(87) PCT Pub. No.: WO2023/158212
PCT Pub. Date: Aug. 24, 2023

(65) Prior Publication Data
US 2025/0150618 A1 May 8, 2025

Related U.S. Application Data

(60) Provisional application No. 63/310,534, filed on Feb. 15, 2022, provisional application No. 63/310,542, filed on Feb. 15, 2022.

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/159* (2014.11); *H04N 19/176* (2014.11); *H04N 19/54* (2014.11)

(58) Field of Classification Search
None
See application file for complete search history.

(56) References Cited

U.S. PATENT DOCUMENTS

2016/0366416 A1   12/2016   Liu et al.
2017/0238005 A1*   8/2017   Chien .................. H04N 19/139
                                                        375/240.16
(Continued)

FOREIGN PATENT DOCUMENTS

CN          104717513  A      6/2015
WO       2017195608  A1    11/2017
(Continued)

*Primary Examiner* — Christopher G Findley
(74) *Attorney, Agent, or Firm* — Bryan Cave Leighton Paisner LLP

(57) ABSTRACT

An image encoding/decoding method, a bitstream transmission method, and a computer-readable recording medium storing a bitstream are provided. The image decoding method according to the present disclosure, performed by an image decoding apparatus, comprises the steps of: acquiring first information on the basis that the prediction direction of a current block is bidirectional; on the basis that the first information indicates that different prediction types are applied to the respective prediction directions of the current block, deriving, from reference blocks, at least one bidirectional motion information candidate corresponding to the different prediction types; and on the basis of any one of the at least one bidirectional motion information candidate, bidirectionally predicting the current block with the different prediction types, wherein the different prediction types are a sub-block unit (sub PU) prediction type and a non-sub-block unit (non-sub PU) prediction type.

15 Claims, 18 Drawing Sheets

Reference picture list[L0]        Current picture        Reference picture list[L1]
Sub-pu based MC        Non-sub-pu based MC

(51) Int. Cl.
　　　*H04N 19/159*　　　(2014.01)
　　　*H04N 19/176*　　　(2014.01)
　　　*H04N 19/54*　　　(2014.01)

(56)　　　　　　　References Cited

U.S. PATENT DOCUMENTS

| 2020/0112741 A1 | 4/2020 | Han et al. |
| 2020/0296383 A1 | 9/2020 | Li et al. |
| 2021/0092435 A1 | 3/2021 | Liu et al. |

FOREIGN PATENT DOCUMENTS

| WO | 2020138958 A1 | 7/2020 |
| WO | 2020232845 A1 | 11/2020 |
| WO | 2021025451 A1 | 2/2021 |
| WO | 2021068956 A1 | 4/2021 |
| WO | 2021249375 A1 | 12/2021 |

* cited by examiner

FIG. 12
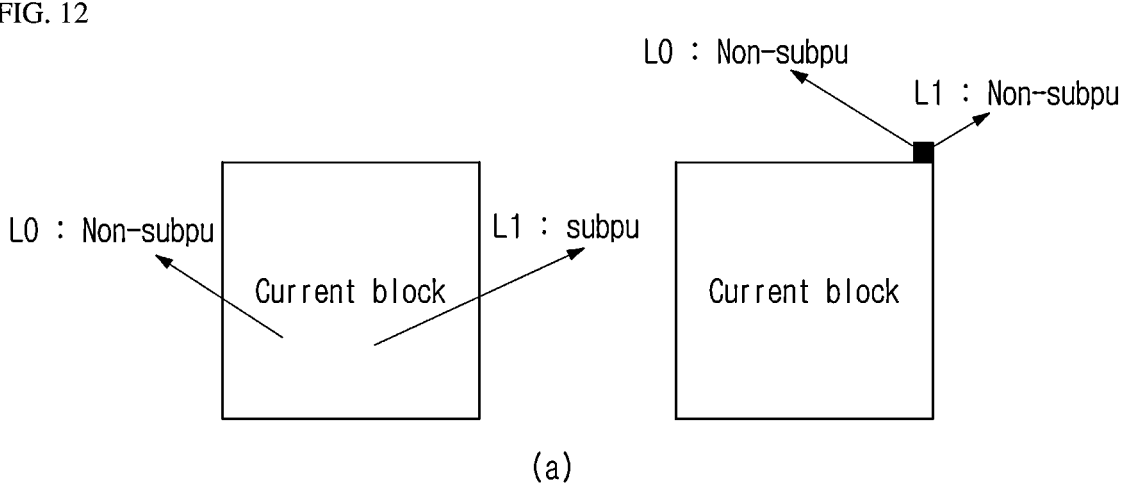
(a)
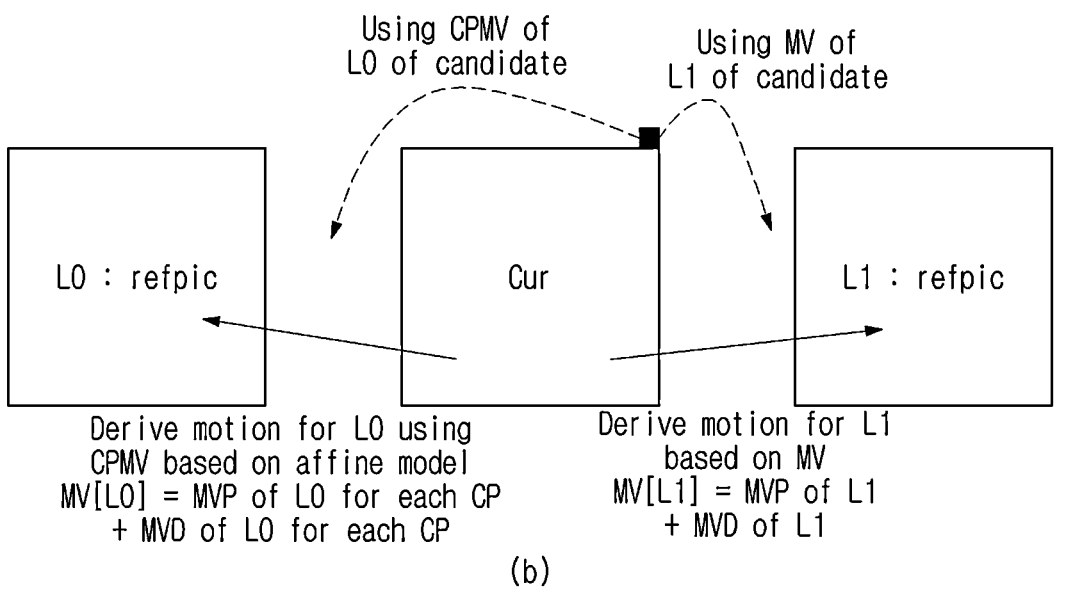
(b)

FIG. 13
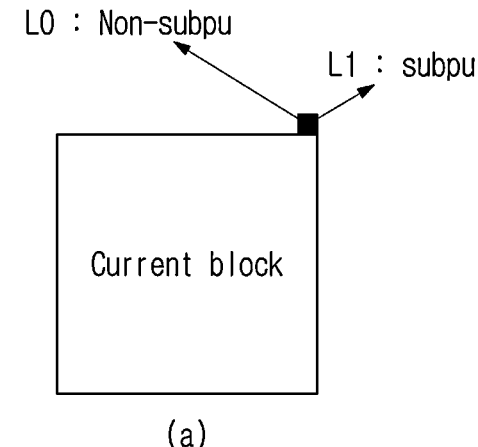
(a)
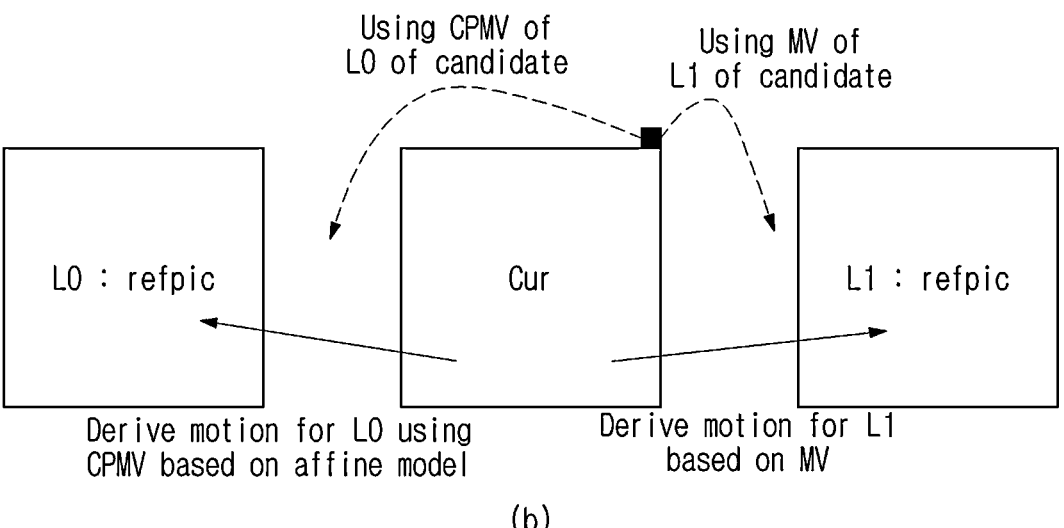
(b)

(a)

(b)

FIG. 24
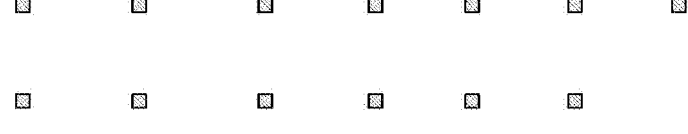
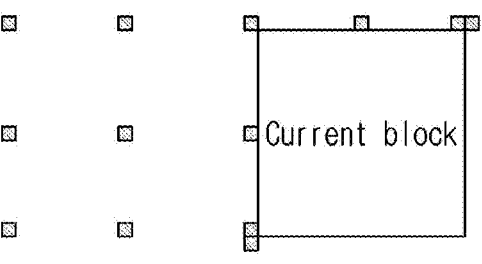
Current block

IMAGE ENCODING/DECODING METHOD, METHOD FOR TRANSMITTING BITSTREAM, AND RECORDING MEDIUM STORING BITSTREAM

CROSS-REFERENCE TO RELATED APPLICATIONS

This application is a National Phase entry pursuant to 35 U.S.C. § 371 of International Application No. PCT/KR2023/002204 filed on Feb. 15, 2023, and claims priority to a U.S. provisional application 63/310,534, filed Feb. 15, 2022, and a U.S. provisional application 63/310,542, filed Feb. 15, 2022, the entire contents of which are incorporated herein for all purposes by this reference.

TECHNICAL FIELD

The present disclosure relates to an image encoding/decoding method, a method of transmitting a bitstream and a recording medium storing a bitstream, and, more particularly, to bi-prediction based on different types of prediction units during inter prediction.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide a method of performing bi-prediction based on different types of prediction units.

An object of the present disclosure is to provide various methods of deriving prediction candidates for bi-prediction.

An object of the present disclosure is to provide a method of encoding and obtaining a motion vector difference.

Another object of the present disclosure is to provide a non-transitory computer-readable recording medium storing a bitstream generated by an image encoding method according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding method according to the present disclosure.

The technical problems solved by the present disclosure are not limited to the above technical problems and other technical problems which are not described herein will become apparent to those skilled in the art from the following description.

An image decoding method according to an aspect of the present disclosure is an image decoding method performed by an image decoding apparatus. The image decoding method may comprise obtaining first information based on a prediction direction of a current block being bidirectional, deriving at least one bidirectional motion information candidate corresponding to different prediction types from reference blocks, based on the first information specifying that the different prediction types are applied to each prediction direction of the current block, and bi-predicting the current block with the different prediction types, based on any one of the at least one bidirectional motion information candidate. The different prediction types may be a sub-block unit (sub PU) prediction type and a non-sub-block unit (non-sub PU) prediction type.

An image encoding method according to another aspect of the present disclosure is an image encoding method performed by an image encoding apparatus. The image encoding method may comprise determining whether different prediction types are applied to each prediction direction of a current block based on a prediction direction of the current block being bidirectional, first information specifying that different prediction types being applied to each prediction direction of the current block being encoded into a bitstream, deriving at least one bidirectional motion information candidate corresponding to the different prediction types from reference blocks, based on the different prediction types being applied to each prediction direction of the current block, and bi-predicting the current block with the different prediction types based on any one of the at least one bidirectional motion information candidate. The different prediction types may be a sub-block unit (sub PU) prediction type and a non-sub-block unit (non-sub PU) prediction type.

A computer-readable recording medium according to another aspect of the present disclosure can store a bitstream generated by the image encoding method or apparatus of the present disclosure.

A transmission method according to another aspect of the present disclosure may transmit a bitstream generated by the image encoding method or apparatus of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

Also, according to the present disclosure, compression efficiency can be improved by adaptively deriving motion information for each prediction direction.

Also, according to the present disclosure, candidates for deriving different motion information for each prediction direction can be efficiently constructed.

Also, according to the present disclosure, bit efficiency for signaling of motion vector differences can be improved.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 9 is a flowchart illustrating an image encoding method according to an embodiment of the present disclosure.

FIGS. 12 to 15 are diagrams for explaining examples of deriving a bidirectional motion information candidate.

FIG. 24 is a diagram for explaining various positions of reference blocks.

DETAILED DESCRIPTION

Figure 1:
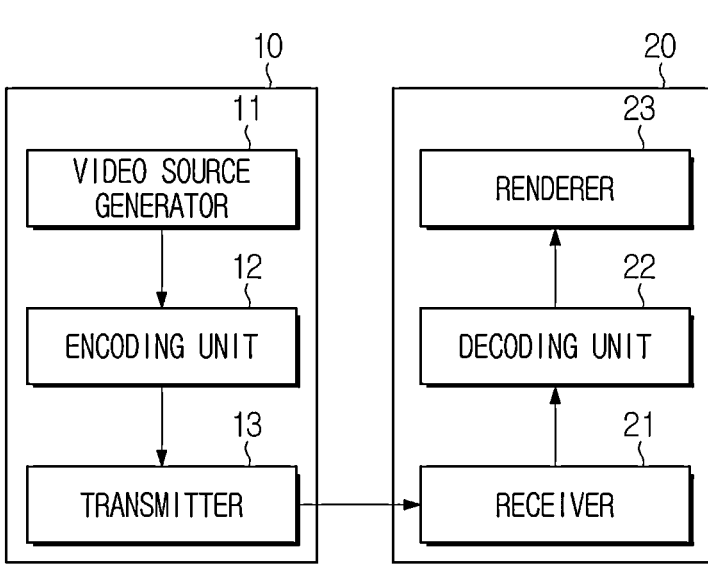
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block". In addition, the "chroma component block of the current block" may be expressed by including an explicit description of a chroma component block, such as "chroma block" or "current chroma block".

In the present disclosure, the term " " and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (encoder) 12 and a transmitter 13. The decoding apparatus 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 12, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
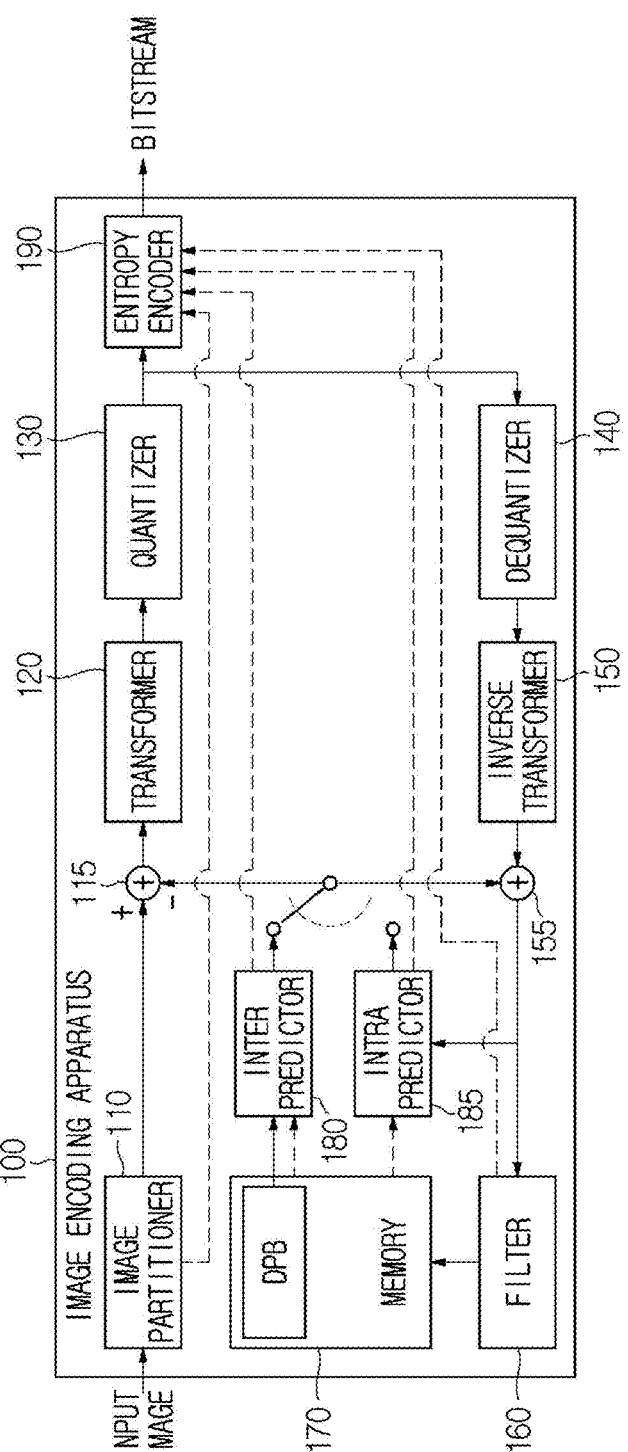
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
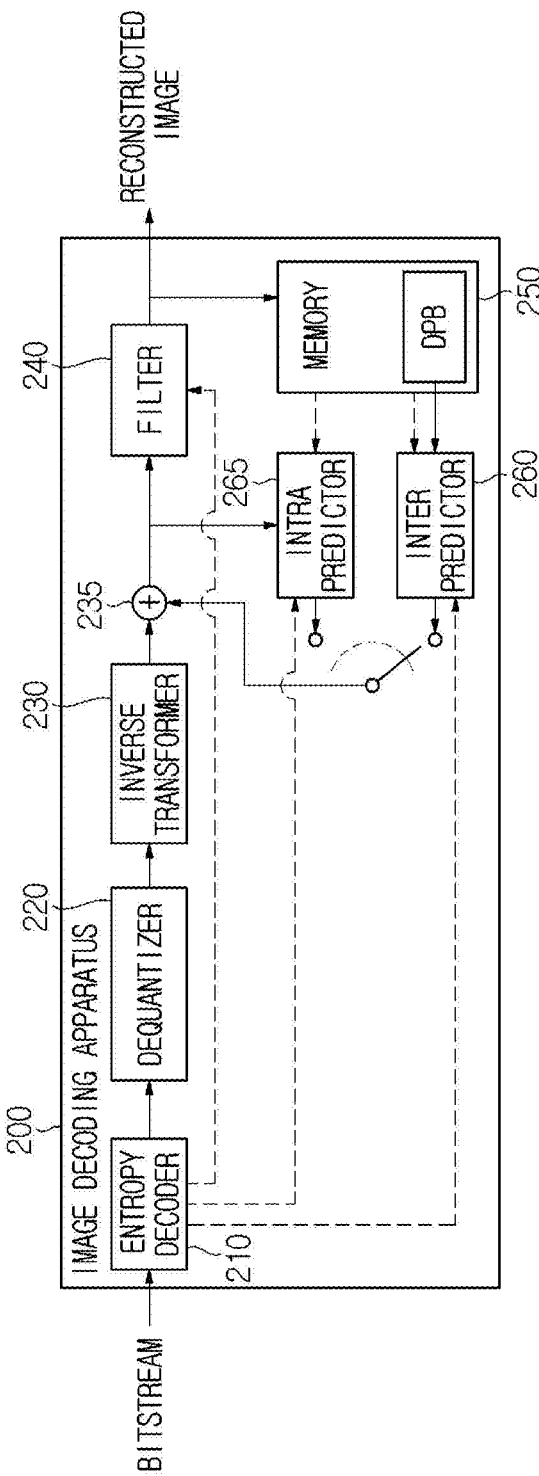
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Inter Prediction

The prediction unit of the image encoding apparatus 100 and the image decoding apparatus 200 may derive a prediction sample by performing inter prediction on a per-block basis. Inter prediction can be a prediction derived in a manner that is dependent on data elements (e.g., sample values or motion information) of picture(s) other than the current picture. When inter prediction is applied to a current block, a predicted block (a prediction sample array) for the current block may be derived on the basis of a reference block (a reference sample array) specified by a motion vector on a reference picture indicated by a reference picture index. Herein, in order to reduce the amount of motion information transmitted in the inter prediction mode, the motion information of the current block may be predicted on a per block, subblock, or sample basis on the basis of the correlation of motion information between a neighboring block and the current block. The motion information may include a motion vector and a reference picture index. The motion information may further include inter prediction type (L0 prediction, L1 prediction, Bi prediction, etc.) information. When inter prediction is applied, neighboring blocks may include a spatial neighboring block present in the current picture and a temporal neighboring block present in the reference picture. The reference picture including the reference block and the reference picture including the temporal neighboring block may be the same or different. The temporal neighboring block may be called a collocated reference block or a collocated CU (colCU). The reference picture including the temporal neighboring block may be called a collocated picture (colPic). For example, a motion information candidate list may be constructed on the basis of neighboring blocks of the current block. A flag or index information indicating which candidate is selected (used) to derive a motion vector and/or a reference picture index of the current block may be signaled. Inter prediction may be performed on the basis of various prediction modes. For example, in the case of a skip mode and a merge mode, motion information of a current block may be the same as motion information of a selected neighboring block. In the case of the skip mode, unlike the merge mode, the residual signal may not be transmitted. In the case of a motion information prediction (motion vector prediction, MVP) mode, a motion vector of a selected neighboring block may be used as a motion vector predictor, and a motion vector difference may be signaled. In this case, a motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be called an L0 motion vector or MVL0, and a motion vector in the L1 direction may be called an L1 motion vector or MVL1. The prediction based on the L0 motion vector may be called L0 prediction. The prediction based on the L1 motion vector may be called L1 prediction. The prediction based on both the L0 motion vector and the L1 motion vector may be called bi-prediction. Herein, the L0 motion vector may refer to a motion vector associated with a reference picture list L0 (L0), and the L1 motion vector may refer to a motion vector associated with a reference picture list L1 (L1). The reference picture list L0 may include, as reference pictures, pictures preceding the current picture in terms of output order. The reference picture list L1 may include pictures following the current picture in terms of output order. The preceding pictures may be called forward (reference) pictures, and the following pictures may be called backward (reference) pictures. The reference picture list L0 may further include, as reference pictures, pictures following the current picture in terms of output order. In this case, within the reference picture list L0, the preceding pictures may be indexed first, and the following pictures may be indexed next. The reference picture list L1 may further include, as reference pictures, pictures preceding the current picture in terms of output order. In this case, within the reference picture list1, the following pictures may be indexed first, and the preceding pictures may be indexed next. Herein, the output order may correspond to the picture order count (POC) order.

Figures 4, 5:
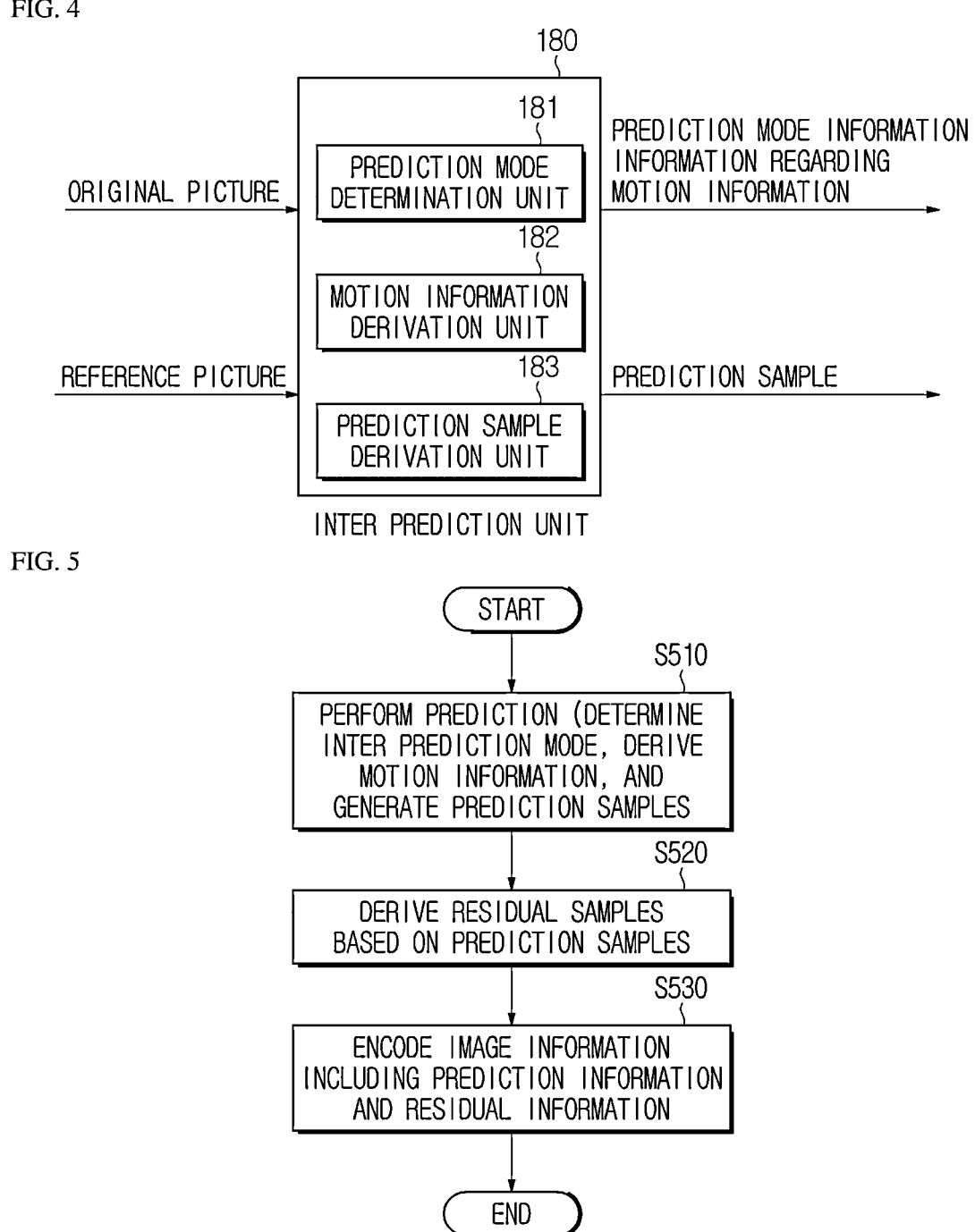
FIG. 4 is a view schematically showing an inter prediction unit of an image encoding apparatus.
FIG. 5 is a flowchart illustrating a method of decoding an image based on inter prediction.

FIG. 4 is a diagram schematically showing the inter prediction unit 180 of the image encoding apparatus 100, and FIG. 5 is a flowchart showing a method of encoding an image based on inter prediction.

The image encoding apparatus 100 may perform inter prediction on a current block (S510). The image encoding apparatus 100 may derive an inter prediction mode and motion information of the current block, and may generate prediction samples of the current block. Herein, the procedures of determination of the inter prediction mode, derivation of the motion information, and generation of the prediction samples may be performed simultaneously, or any one procedure may be performed before the other procedures. For example, the inter prediction unit 180 of the image encoding apparatus 100 may include a prediction mode determination unit 181, a motion information derivation unit 182, and a prediction sample derivation unit 183. The prediction mode determination unit 181 may determine the prediction mode for the current block. The motion information derivation unit 182 may derive the motion information of the current block. The prediction sample derivation unit 183 may derive the prediction samples of the current block. For example, the inter prediction unit 180 of the image encoding apparatus 100 may search a predetermined area (search area) of reference pictures for a block similar to the current block through motion estimation, and may derive a reference block of which the difference from the current block is a minimum or less than or equal to a predetermined standard. On the basis of this, a reference picture index indicating the reference picture in which the reference block is located may be derived, and a motion vector may be derived on the basis of the location difference between the reference block and the current block. The image encoding apparatus 100 may determine a mode applied to the current block among various prediction modes. The image encoding apparatus 100 may compare RD costs for the various prediction modes and may determine the optimum prediction mode for the current block.

For example, when the skip mode or the merge mode is applied to the current block, the image encoding apparatus 100 may construct a merge candidate list described later, and may derive a reference block of which the difference from the current block is a minimum or less than or equal to a predetermined standard, among reference blocks indicated by merge candidates included in the merge candidate list. In this case, the merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the image encoding apparatus 100 may construct an (A)MVP candidate list described later, and may use, as a motion vector predictor (mvp) of the current block, a motion vector of an mvp candidate selected among mvp candidates included in the (A)MVP candidate list. In this case, for example, a motion vector indicating a reference block derived by the above-described motion estimation may be used as a motion vector of the current block. Among the mvp candidates, an mvp candidate having the motion vector having the minimum difference from the motion vector of the current block may be the selected mvp candidate. A motion vector difference (MVD) that is a difference resulting from subtracting the mvp from the motion vector of the current block may be derived. In this case, information on the MVD may be signaled to the image decoding apparatus 200. In addition, when the (A)MVP mode is applied, a value of the reference picture index may be constructed as reference picture index information and may be separately signaled to the image decoding apparatus 200.

The image encoding apparatus 100 may derive residual samples on the basis of the prediction samples (S520). The image encoding apparatus 100 may compare the prediction samples with the original samples of the current block to derive the residual samples. The image encoding apparatus 100 may encode image information including prediction information and residual information (S530). The image encoding apparatus 100 may output the encoded image information in the form of a bitstream. The prediction information is pieces of information related to the prediction procedure, and may include prediction mode information (e.g., a skip flag, a merge flag, or a mode index) and information on motion information. The information on the motion information may include candidate selection information (e.g., a merge index, an mvp flag, or an mvp index) that is information for deriving a motion vector. In addition, the information on the motion information may include the information on the MVD and/or the reference picture index information described above. In addition, the information on the motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus, or may be transmitted to the image decoding apparatus 200 over a network.

In the meantime, as described above, the image encoding apparatus 100 may generate a reconstructed picture (including reconstructed samples and a reconstructed block) on the basis of the reference samples and the residual samples. This is to derive the same prediction result by the image encoding apparatus 100 as that performed in the image decoding apparatus 200, and through this, coding efficiency may be increased. Accordingly, the image encoding apparatus 100 may store a reconstructed picture (or reconstructed samples, a reconstructed block) in a memory, and may use the same as a reference picture for inter prediction. As described above, an in-loop filtering procedure may be further applied to the reconstructed picture.

Figures 6, 7:
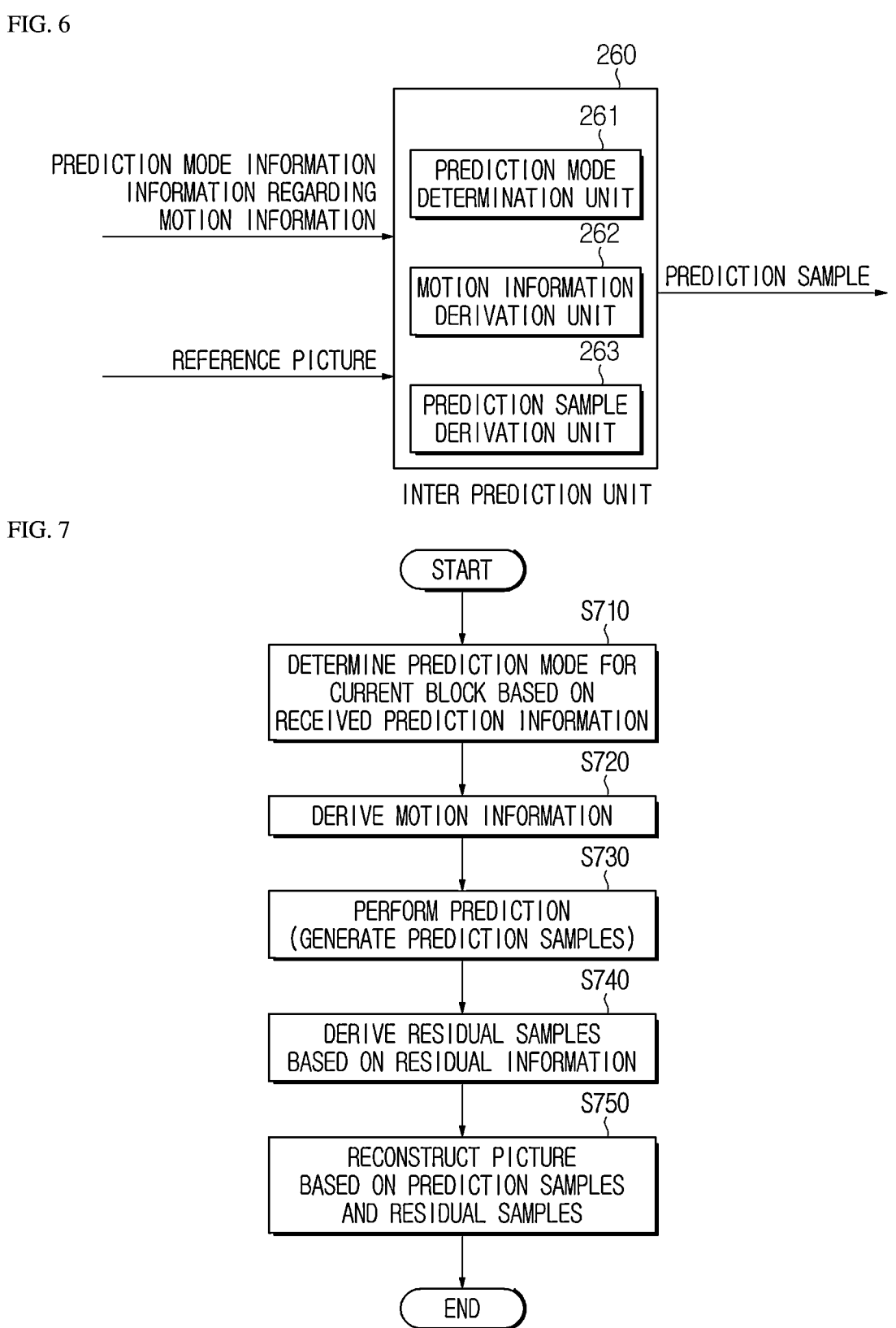
FIG. 6 is a view schematically showing an inter prediction unit of an image decoding apparatus.
FIG. 7 is a flowchart illustrating a method of decoding an image based on inter prediction.

FIG. 6 is a diagram schematically showing the inter prediction unit 260 of the image decoding apparatus 200, and FIG. 7 is a flowchart showing a method of decoding an image based on inter prediction.

The image decoding apparatus 200 may perform the operation corresponding to the operation performed by the image encoding apparatus 100. The image decoding apparatus 200 may perform prediction on the current block on the basis of the received prediction information and may derive prediction samples.

Specifically, the image decoding apparatus 200 may determine a prediction mode for the current block on the basis of the received prediction information (S710). The image decoding apparatus 200 may determine which inter prediction mode is applied to the current block on the basis of the prediction mode information in the prediction information.

For example, on the basis of the merge flag, it may be determined whether the merge mode is applied to the current block or the (A)MVP mode is determined. Alternatively, one of various inter prediction mode candidates may be selected on the basis of the mode index. The inter prediction mode candidates may include a skip mode, a merge mode, and/or an (A)MVP mode, or may include various inter prediction modes described later.

The image decoding apparatus 200 may derive motion information of the current block on the basis of the determined inter prediction mode (S720). For example, when the skip mode or the merge mode is applied to the current block, the image decoding apparatus 200 may construct a merge candidate list described later, and may select one merge candidate among merge candidates included in the merge candidate list. The selection may be performed on the basis of the above-described selection information (a merge index). The motion information of the current block may be derived using the motion information of the selected merge candidate. The motion information of the selected merge candidate may be used as the motion information of the current block.

As another example, when the (A)MVP mode is applied to the current block, the image decoding apparatus 200 may construct an (A)MVP candidate list described later, and may use, as a motion vector predictor (mvp) of the current block, a motion vector of an mvp candidate selected among mvp candidates included in the (A)MVP candidate list. The selection may be performed on the basis of the above-described selection information (an mvp flag or an mvp index). In this case, the MVD of the current block may be derived on the basis of the information on the MVD, and the motion vector of the current block may be derived on the basis of the mvp of the current block and the MVD. In addition, a reference picture index of the current block may be derived on the basis of the reference picture index information. A picture indicated by the reference picture index in the reference picture list related to the current block may be derived as a reference picture that is referenced for inter prediction of the current block.

In the meantime, as will be described later, the motion information of the current block may be derived without constructing a candidate list. In this case, the motion information of the current block may be derived according to a procedure described in a prediction mode described later. In this case, the candidate list configuration as described above may be omitted.

The image decoding apparatus 200 may generate prediction samples for the current block on the basis of the motion information of the current block (S730). In this case, the reference picture may be derived on the basis of the reference picture index of the current block, and the prediction samples of the current block may be derived using samples of a reference block indicated on the reference picture by the motion vector of the current block. In this case, as described later, in some cases, a prediction sample filtering procedure may be further performed on all or some of the prediction samples of the current block.

For example, the inter prediction unit 260 of the image decoding apparatus 200 may include a prediction mode determination unit 261, a motion information derivation unit 262, and a prediction sample derivation unit 263. The prediction mode determination unit 181 may determine the prediction mode for the current block on the basis of received prediction mode information. The motion information derivation unit 182 may derive the motion information (a motion vector and/or a reference picture index) of the current block on the basis of received information on the motion information. The prediction sample derivation unit 183 may derive the prediction samples of the current block.

The image decoding apparatus 200 may generate residual samples for the current block on the basis of the received residual information (S740). The image decoding apparatus 200 may generate reconstructed samples for the current block on the basis of the prediction samples and the residual samples, and may generate, on the basis of this, a reconstructed picture (S750). Afterward, as described above, an in-loop filtering procedure may be further applied to the reconstructed picture.

Figure 8:
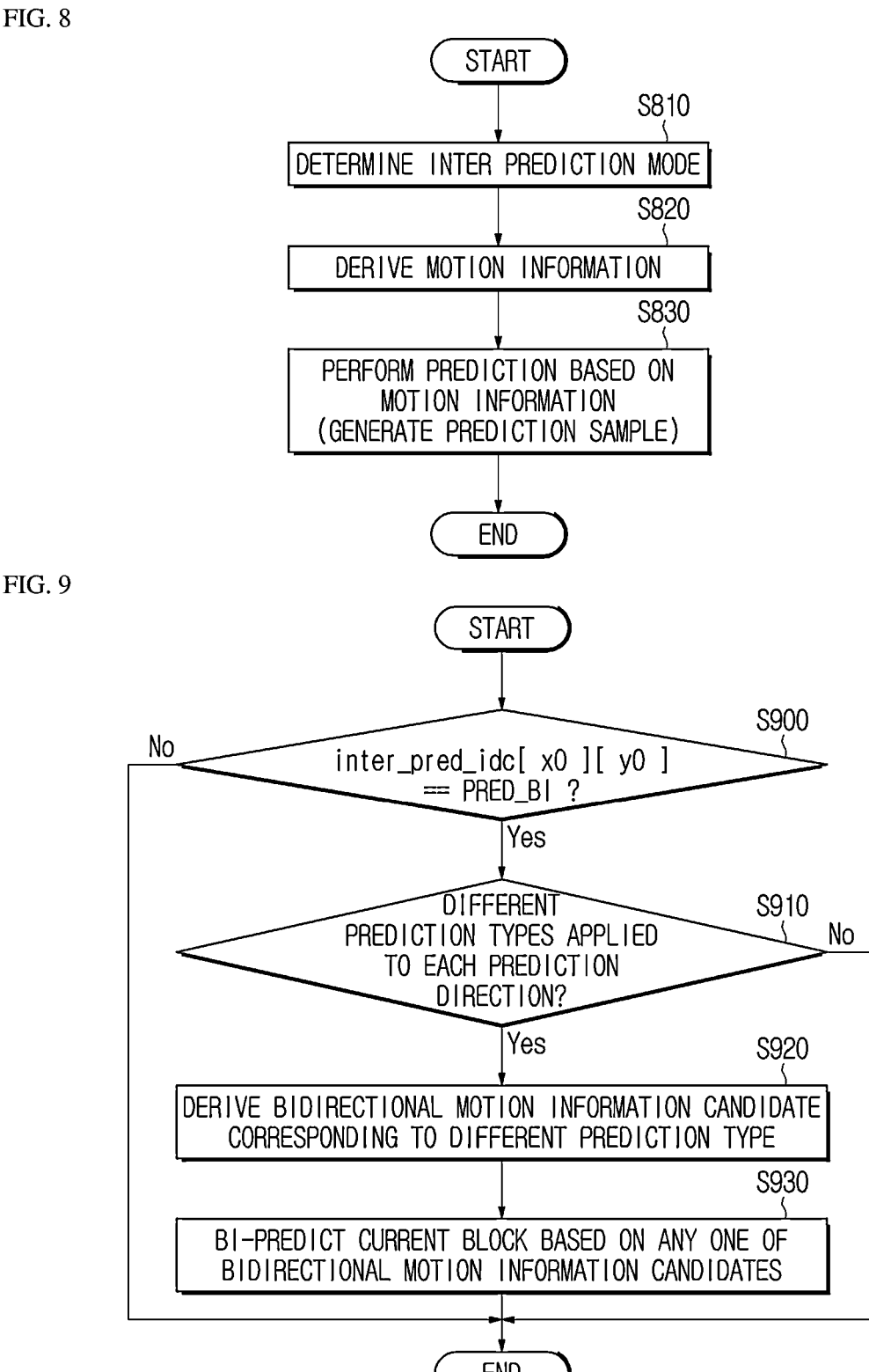
FIG. 8 is a flowchart illustrating an inter prediction method.

Referring to FIG. 8, the inter prediction procedure may include the steps of determining an inter prediction mode (S810), deriving motion information according to the determined prediction mode (S820), and performing prediction based on the derived motion information (generating a prediction sample) (S830). The inter prediction procedure may be performed in the image encoding apparatus 100 and the image decoding apparatus 200 as described above.

Inter Prediction Mode Determination

Various inter prediction modes may be used for prediction of the current block in the picture. For example, various modes, such as a merge mode, a skip mode, a motion vector prediction (MVP) mode, an affine mode, a subblock merge mode, and a merge with MVD (MMVD) mode, and the like may be used. A decoder side motion vector refinement (DMVR) mode, an adaptive motion vector resolution (AMVR) mode, a bi-prediction with CU-level weight (BCW), a bi-directional optical flow (BDOF), and the like may also be used as additional modes additionally or instead. The affine mode may be called an affine motion prediction mode. The MVP mode may be referred to as advanced motion vector prediction (AMVP) mode. In this document, some modes and/or motion information candidates derived by some modes may be included as one of motion information candidates of other modes. For example, an HMVP candidate may be added as a merge candidate in the merge/skip mode or may be added as an mvp candidate in the MVP mode.

Prediction mode information indicating the inter prediction mode of the current block may be signaled from the image encoding apparatus 100 to the image decoding apparatus 200. The prediction mode information may be included in the bitstream and received by the image decoding apparatus 200. The prediction mode information may include index information indicating one of a plurality of candidate modes. Alternatively, the inter prediction mode may be indicated through hierarchical signaling of flag information. In this case, the prediction mode information may include one or more flags. For example, a skip flag may be signaled to indicate whether a skip mode is applied, and if the skip mode is not applied, a merge flag may be signaled to indicate whether a merge mode is applied, and if the merge mode is not applied, it is indicated to apply an MVP mode or a flag for additional classification may be further signaled. The affine mode may be signaled in an independent mode or may be signaled in a mode dependent on the merge mode or the MVP mode. For example, the affine mode may include an affine merge mode and an affine MVP mode.

Derivation of Motion Information

Inter prediction may be performed using motion information of the current block. The image encoding apparatus 100 may derive optimal motion information for the current block through a motion estimation procedure. For example, the image encoding apparatus 100 may search for a similar reference block having a high correlation in units of fractional pixels within a predetermined search range in the reference picture using the original block in the original picture for the current block, thereby deriving motion information. Similarity of blocks may be derived based on a difference of phase based sample values. For example, the similarity of the blocks may be calculated based on the SAD between the current block (or template of the current block) and the reference block (or template of the reference block). In this case, motion information may be derived based on a reference block having the smallest SAD in the search area. The derived motion information may be signaled to the image decoding apparatus 200 according to various methods based on the inter prediction mode.

Generation of Prediction Sample

A predicted block for the current block may be derived based on motion information derived according to the prediction mode. The predicted block may include prediction samples (prediction sample array) of the current block. When the motion vector of the current block indicates a fractional sample unit, an interpolation procedure may be performed, through which prediction samples of the current block may be derived based on reference samples in the fractional sample unit within a reference picture. When affine inter prediction is applied to the current block, prediction samples may be generated based on a sample/subblock unit MV. When bi-prediction is applied, prediction samples derived through weighting or weighted averaging (according to phase) of prediction samples derived based on L0 prediction (that is, prediction using reference picture and MVL0 in reference picture list L0) and prediction samples derived based on L1 prediction (that is, prediction using reference picture and MVL1 in reference picture list L1) may be used as prediction samples of the current block. When bi-prediction is applied, if the reference picture used for L0 prediction and the reference picture used for L1 prediction are located in different temporal directions with respect to the current picture (i.e., bi-prediction and bidirectional prediction), it may be called true bi-prediction.

As described above, reconstructed samples and reconstructed pictures may be generated based on the derived prediction samples, and thereafter, a procedure such as in-loop filtering may be performed.

Affine Prediction

Existing video coding systems use only one motion vector (MV) (using translation motion model) to express the motion of a coding block. However, although the above method may have expressed optimal motion on a block basis, this is not the actual optimal motion of each pixel and if the optimal MV may be determined on a pixel basis, coding efficiency can be increased. To this end, in the present embodiment, an affine motion prediction method of performing encoding using an affine motion model will be described. The affine motion prediction method may express MV in each pixel unit of a block using 2, 3, or 4 MVs.

The affine motion model may express four types of motions. Among the motions that may be expressed by an affine motion model, an affine motion model that expresses three types of motions (translation, scale, and rotate) is called a similarity (or simplified) affine motion model, and herein proposed methods will be explained based on the similarity (or simplified) affine motion model. However, the methods are not limited to the corresponding motion model.

Affine motion prediction may determine the MV of the pixel position included in a block using two or more control point motion vectors (CPMVs). At this time, the set of MVs is called an affine motion vector field (MVF), and the affine MVF may be determined in the encoding/decoding process in units of pixels or in units of predefined subblocks. If it is determined in units of pixels, the MV is obtained based on each pixel value, and in the case of the subblock unit, the MV of the corresponding block may be obtained based on the pixel value at the center of the subblock (the lower right side of the center, i.e., the lower right sample among the four central samples).

If affine prediction is available, motion models applicable to the current block may include the following three models: translational motion model, 4-parameter affine motion model, and 6-parameter affine motion model. Here, the translational motion model may represent a model in which existing block unit motion vectors are used, the 4-parameter affine motion model may represent a model in which two CPMVs are used, and the 6-parameter affine motion model may represent a model in which three CPMVs are used.

The above affine motion prediction may include affine MVP (or affine inter) mode and affine merge. In affine motion prediction, motion vectors of a current block may be derived on a sample basis or a sub-block basis.

When the affine merge mode is applied, CPMVs of the current block may be derived using CPMVs of neighboring blocks. In this case, CPMVs of the neighboring blocks may be used as CPMVs of the current block as they are, or CPMVs of the neighboring blocks may be modified based on the size of the neighboring blocks and the size of the current block and used as CPMVs of the current block.

Meanwhile, in the case of an affine merge in which MV is derived on a sub-block basis, it may be called a subblock merge mode, and this may be indicated based on merge_subblock_flag (value 1). In this case, the affine merging candidate list described below may also be called a subblock merging candidate list. In this case, the subblock merging candidate list may further include a candidate derived by SbTMVP described below. In this case, the candidate derived by sbTMVP may be used as a candidate of index 0 of the subblock merge candidate list. In other words, the candidate derived by sbTMVP may be positioned before the inherited affine candidates and the constructed affine candidates described below in the subblock merging candidate list.

In the affine mvp mode, after determining two or more control point motion vector predictions (CPMVP) and CPMV for the current block, a control point motion vector difference (CPMVD) corresponding to a difference value may be transmitted from the image encoding apparatus 100 to the image decoding apparatus 200.

For example, when the value of affine merge flag or merge_subblock_flag is 0, the affine MVP mode may be applied. Alternatively, for example, when the value of inter_affine_flg is 1, the affine MVP mode may be applied. The affine MVP mode may be called an affine CP MVP mode. Alternatively, the affine MVP mode may be called an affine inter mode or an inter affine mode. The affine mvp candidate list may be called a control point motion vectors predictor candidate list.

EMBODIMENT

The present disclosure relates to bidirectional motion compensation in an inter prediction process. Specifically, the present disclosure relates to a method of performing bidirectional prediction of a current block by applying different prediction types for each prediction direction (L0 or L1).

Different prediction types may be sub-block unit (sub PU) prediction types and non-sub block unit (non-sub PU) prediction types. The sub PU prediction type may be referred to as a sub PU prediction mode, and the sub-block merge mode and affine mode in which MV is derived on a sub-block basis may be included in the sub PU prediction type. The non-sub PU prediction type is a prediction type that does not correspond to the sub PU prediction type, and may be referred to as a non-sub PU prediction mode.

In the conventional bidirectional motion compensation process, motion compensation is performed based on the sub PU prediction type in both directions (L0, L1) when the current block is of a sub PU prediction type, and motion compensation is performed based on the non-sub PU prediction type in both directions when the current block is of a non-sub PU prediction type, thereby generating a prediction block.

For example, in the conventional merge mode, prediction mode determination through bidirectional prediction, motion information derivation, and prediction sample generation may derive bidirectional motion information from prediction candidates. Specific examples of performing bidirectional prediction in the conventional merge mode may be classified as follows. That is, the conventional merge mode does not support a method of predicting one prediction direction based on a sub PU prediction type and predicting the other prediction direction based on a non-sub PU prediction type.

If merge_subblock_flag is 1, prediction is performed based on the sub PU prediction type in both directions.

If merge_subblock_flag is 0, prediction is performed based on the non-sub PU prediction type in both directions.

In addition, in the conventional merge mode, information used for prediction varies depending on each prediction type. In other words, the conventional merge mode has a limitation that the same information must be used in both directions during the process of performing bidirectional prediction.

When applying the sub PU prediction type, if the neigh-
boring block (reference block) is a block predicted in
affine mode, the stored CPMV of the neighboring block
is used.

When applying the non-sub PU prediction type, the stored
MV of the neighboring block is used.

As another example, the AMVP mode in which MVD,
MVP index, reference picture index, etc. is signaled to
derive motion information may be classified as follows. That
is, the conventional AMVP mode does not support a method
of predicting one prediction direction based on the sub PU
prediction type and the other prediction direction based on
the non-sub PU prediction type.

When inter_affine_flag is 1, prediction is performed based
on the sub PU prediction type in both directions.

When inter_affine_flag is 0, prediction is performed based
on the non-sub PU in both directions.

In addition, in the conventional AMVP mode, information
used for prediction varies depending on each prediction
type. In other words, the conventional AMVP mode has a
limitation that the same information must be used in both
directions during the process of performing bidirectional
prediction.

When applying the sub PU prediction type, if the neigh-
boring block (reference block) is a block predicted in
affine mode, the stored CPMV of the neighboring block
is used.

When applying the non-sub PU prediction type, the stored
MV of the neighboring block is used.

Furthermore, in the conventional AMVP mode, the
amount of information signaled through a bitstream varies
depending on each prediction type.

When applying the sub PU prediction type, two or more
MVDs (xoffset, yoffset) required to derive MV of each
CP are signaled.

When applying the non-sub PU prediction type, MVD
required to generate a prediction block is signaled.

The method proposed by the present disclosure may
correspond to a method of simultaneously supporting dif-
ferent prediction types (i.e., sub PU prediction type and
non-sub PU prediction type) in the process of generating a
prediction block on a prediction direction basis when per-
forming bidirectional prediction for one prediction block.
Therefore, according to the method proposed by the present
disclosure, since different prediction types are adaptively
derived for each prediction direction, compression efficiency
can be improved.

In addition, in the method proposed by the present dis-
closure, motion compensation through different prediction
types is performed for each prediction direction, and in this
process, necessary information may be adaptively referred
to for each prediction direction. Therefore, according to the
method proposed by the present disclosure, the efficiency of
bits required to signal necessary information can be
improved.

Embodiment 1

FIG. 9 is a flowchart illustrating an image encoding
method according to Embodiment 1.

Referring to FIG. 9, the image encoding apparatus 100
may determine whether a prediction direction of a current
block is bidirectional (S900). For example, whether the
prediction direction of the current block is bidirectional may
be determined based on whether the value of inter_pred_idc,
which is a syntax element indicating the prediction direction
of the current block, indicates bi-prediction (PRED_BI).

If the prediction direction of the current block is bidirec-
tional, the image encoding apparatus 100 may determine
whether different prediction types are applied to each pre-
diction direction (S910). Here, the different prediction types
may be a sub PU prediction type and a non-sub PU predic-
tion type. That is, step S910 may be a process of determining
whether a specific direction is predicted based on the sub PU
prediction type and another direction is predicted based on
the non-sub PU prediction type. First information (merge_
mixed_pu_flag or inter_mixed_pu_flag), which is informa-
tion indicating whether different prediction types are applied
to each prediction direction of the current block, may be
encoded into ae bitstream.

In cases where different prediction types are applied to
each prediction direction, the image encoding apparatus 100
may derive at least one bidirectional motion information
candidate corresponding to the different prediction types
from reference blocks of the current block (S920).

For example, if the L0 direction of the current block is of
the sub PU prediction type and the L1 direction is of the
non-sub PU prediction type, a bidirectional motion infor-
mation candidate having the L0 direction being sub PU
based motion information and the L1 direction being non-
sub PU based motion information may be derived. As
another example, if the L0 direction of the current block is
of the non-sub PU prediction type and the L1 direction is of
the sub PU prediction type, a bidirectional motion informa-
tion candidate having the L0 direction being non-sub PU
based motion information and the L1 direction being sub PU
based motion information may be derived. Here, the sub PU
based motion information may be motion information that
may be used for the sub PU prediction type, and the non-sub
PU based motion information may be motion information
that may be used for the non-sub PU prediction type. At least
one bidirectional motion information candidate may consti-
tute a motion information candidate list.

The image encoding apparatus 100 may bi-predict the
current block based on different prediction types, based on
any one of the derived bidirectional motion information
candidates, i.e., based on the motion information candidate
list (S930).

Figures 10, 11:
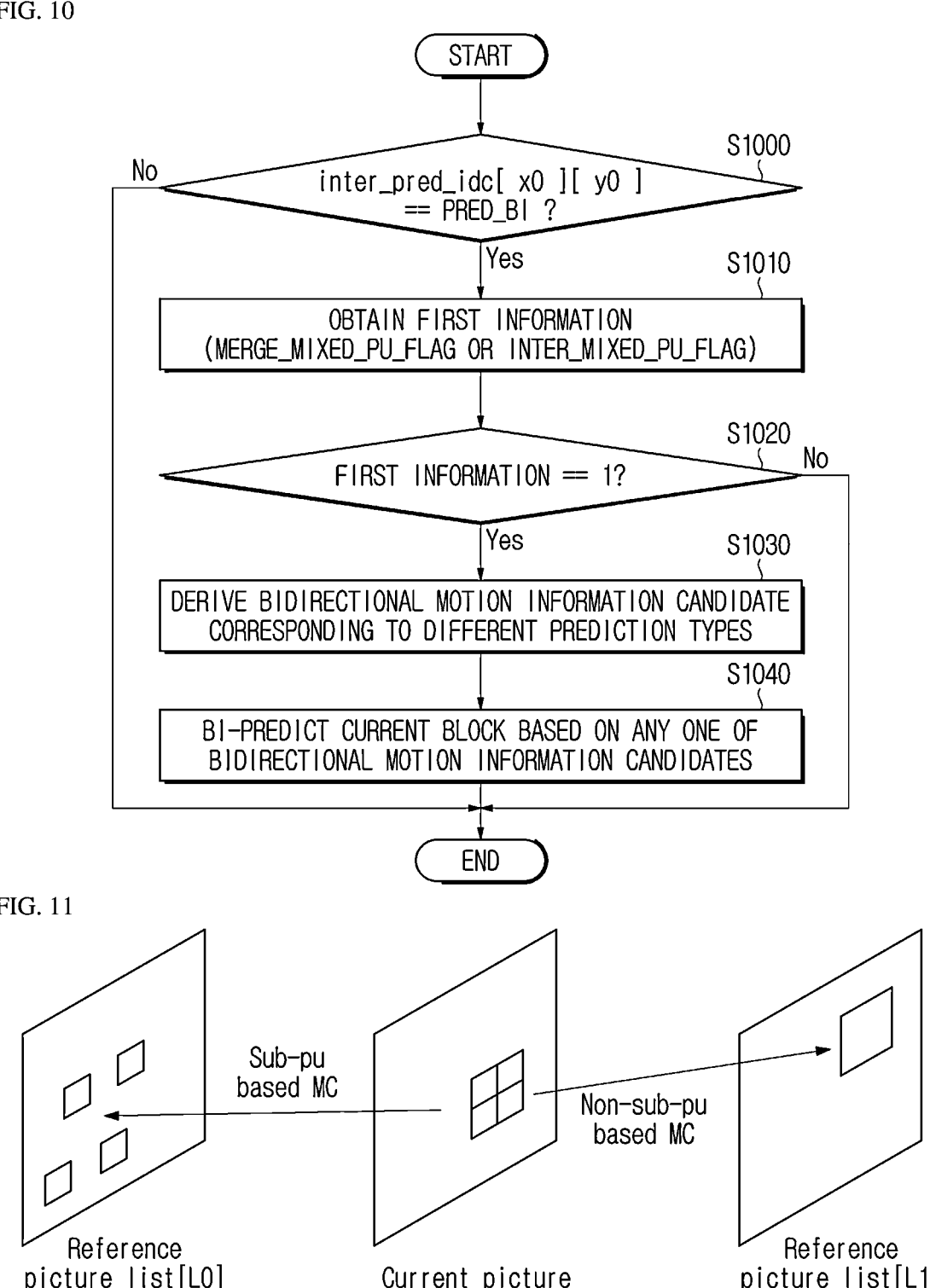
FIG. 10 is a flowchart illustrating an image decoding method according to an embodiment of the present disclosure.
FIG. 11 is a diagram for explaining an example of a bidirectional prediction method according to an embodiment of the present disclosure.

FIG. 10 is a flowchart illustrating an image decoding
method according to Embodiment 1.

Referring to FIG. 10, the image decoding apparatus 200
may determine whether a prediction direction of a current
block is bidirectional (S1000). For example, whether the
prediction direction of the current block is bidirectional may
be determined based on whether the value of inter_pred_idc,
which is a syntax element indicating the prediction direction
of the current block, indicates bidirectional prediction
(PRED_BI).

When the prediction direction of the current block is
bidirectional, the image decoding apparatus 200 may obtain
first information (merge_mixed_pu_flag or inter_
mixed_pu_ flag), which is information indicating whether
different prediction types are applied to each prediction
direction of the current block, from a bitstream (S1010).

The image decoding apparatus 200 may determine
whether different prediction types are applied to each pre-
diction direction of the current block based on the first
information (S1020). In addition, if the first information
indicates that different prediction types are applied to each
prediction direction, the image decoding apparatus 200 may
derive at least one bidirectional motion information candi-
date corresponding to the different prediction types from
reference blocks (S1030).

For example, if the L0 direction of the current block is of the sub PU prediction type and the L1 direction is of the non-sub PU prediction type, a bidirectional motion information candidate having the L0 direction being sub PU based motion information and the L1 direction being non-sub PU based motion information may be derived. As another example, if the L0 direction of the current block is of the non-sub PU prediction type and the L1 direction is of the sub PU prediction type, a bidirectional motion information candidate having the L0 direction being non-sub PU based motion information and the L1 direction being sub PU based motion information may be derived. Here, the sub PU based motion information may be motion information that may be used for the sub PU prediction type, and the non-sub PU based motion information may be motion information that may be used for the non-sub PU prediction type. At least one bidirectional motion information candidate may constitute a motion information candidate list.

The image decoding apparatus 200 may bi-predict the current block based on different prediction types, based on any one of the derived bidirectional motion information candidates, i.e., based on the motion information candidate list (S1040).

FIG. 11 is a diagram for explaining an example of a bi-prediction method according to Embodiment 1. In FIG. 11, it is assumed that the prediction type in the L0 direction (Reference picture list (L0)) of the current block (Current picture) is a sub PU prediction type, and the prediction type in the L1 direction (Reference picture list (L1)) is a non-sub PU prediction type.

Under this assumption, a bidirectional motion information candidate in which the prediction type in the L0 direction is a sub PU prediction type and the prediction type in the L1 direction is a non-sub PU prediction type may be used for bi-prediction of the current block.

Therefore, sub PU based motion compensation (MC) is performed for one direction (e.g., L0), and non-sub PU based motion compensation is performed for the opposite direction (e.g., L1), so that a prediction block for the current block may be generated.

Embodiment 2

As described above, in merge mode, since the bidirectional motion information of a current block should be derived only using motion information of a prediction candidate (motion information candidate) without signaling separate syntax (except for the index), the prediction candidate of the present disclosure should satisfy the following two conditions.

Bidirectional motion information may be derived
Motion information required for each prediction direction may be derived (e.g., L0: CPMV, L1: MV)

For example, if a reference block is encoded/decoded by the method proposed by the present disclosure or if the reference block is bi-predicted according to the sub PU prediction type, bidirectional motion information for applying the method proposed by the present disclosure is stored in the corresponding reference block. Therefore, in such cases, bi-prediction of different prediction types may be performed.

As another example, if the reference block is not encoded/decoded by the method proposed by the present disclosure or if the reference block is bi-predicted according to the non-sub PU prediction type, bidirectional motion information for applying the method proposed by the present disclosure may not be stored in the reference block. Accordingly, in such cases, the following method may be performed.

Motion information required for each prediction direction is reconstructed to derive bidirectional motion information candidates.

Motion information of the corresponding reference block is not used to derive bidirectional motion information candidates.

In this way, when the method proposed by the present disclosure is applied to the merge mode, in the process of constructing a prediction candidate list (motion information candidate list) of a current block, if a reference candidate satisfies the following conditions, the reference candidate may be constructed as a prediction candidate, or prediction information regenerated based on the reference candidate may be constructed as the prediction candidate of the current block.

Bidirectional prediction information (bidirectional motion information) may be derived from the motion information of the decoded neighboring block/block in the decoded previous picture (i.e., reference block), and sub PU based motion information may be derived from at least one direction of the bidirectional motion information.

Bidirectional motion information may be derived by decomposing and recombining the motion information of the reference block on a prediction direction basis, and sub PU based motion information may be derived from at least one of the recombined bidirectional motion information.

For any prediction direction, the motion information of the current block may be combined so that it can be derived on a sub PU basis from the motion information of the reference block.

Meanwhile, in the case where the method proposed by the present disclosure is applied to the AMVP mode, since prediction blocks must be generated according to different prediction types for each prediction direction, motion information candidates referred to for prediction in each prediction direction must be adaptively derived.

For example, as in the left side of FIG. 12(a), if the current block is encoded by the proposed method (e.g., L0: non-sub PU, L1: sub PU), motion information candidates may be compensated with signaled MVD to derive motion information of the current block.

In this process, information on reference blocks that have already been decoded in the surrounding area may be referred to and used as motion information candidates, or motion information reconstructed using information on reference blocks may be used as motion information candidates.

That is, in the proposed method, since prediction is performed based on different prediction types for each prediction direction, the referenced information becomes different for each prediction direction. Therefore, the proposed method may be applied only when the necessary information is given.

For example, if a sub PU prediction type is to be applied to the L0 direction of the current block and a non-sub PU prediction type is to be applied to the L1 direction, two or more MVDs for CPMV must be signaled to derive motion information in the L0 direction, and less than two MVDs must be signaled to derive motion information in the L1 direction.

However, if the CPMV in the L0 direction is not derived from the prediction candidate (reference block), the CPMV in the L0 direction of the current block cannot be derived. For example, as in the right side of FIG. 12(a), if the reference block is bi-predicted but both directions are predicted according to the non-sub PU prediction type, or if it is not bi-predicted, appropriate motion information for the current block cannot be derived.

The basic operation when the method proposed by the present disclosure is applied to the AMVP mode is summarized as follows.

As illustrated in FIG. 12(b), when prediction is performed in the L0 direction based on the sub PU prediction type and prediction is performed in the L1 direction based on the non-sub PU prediction type, an MVP for each CP may be derived with reference to L0-direction CPMV of a prediction candidate (reference block), and L0-direction CPMV (motion information) of the current block may be derived by considering each derived MVP and the MVD of each signaled CP. That is, L0-direction motion information candidate of the current block may be derived by applying an affine model to the L0-direction motion information of the prediction candidate. In addition, the L0-direction motion information candidate of the current block may be derived by considering the L1-direction motion information of the prediction candidate and the signaled MVD.

In the present disclosure, the derived bidirectional motion information candidates may constitute a single motion information candidate list. Therefore, compared to the conventional AMVP mode that constructs a separate motion information candidate list for each prediction direction and signals separate index information, the present disclosure may simply construct a motion information candidate list and reduce the amount of bits required for signaling the index information.

Based on the reasons and contents described above, in Embodiment 2, methods of deriving appropriate bidirectional motion information candidates from reference blocks and constructing them into a prediction candidate list (motion information candidate list) are proposed.

Embodiment 2-1

Embodiment 2-1 is an embodiment of deriving a bidirectional motion information candidate of a current block when bidirectional motion information may be derived from motion information of a reference block and sub PU based motion information may be derived from at least one direction among bidirectional motion information. Here, 'when sub PU based motion information may be derived from at least one direction' may mean that at least one or more sub PU based motion information is included in the bidirectional motion information of the reference block.

Figure 14:
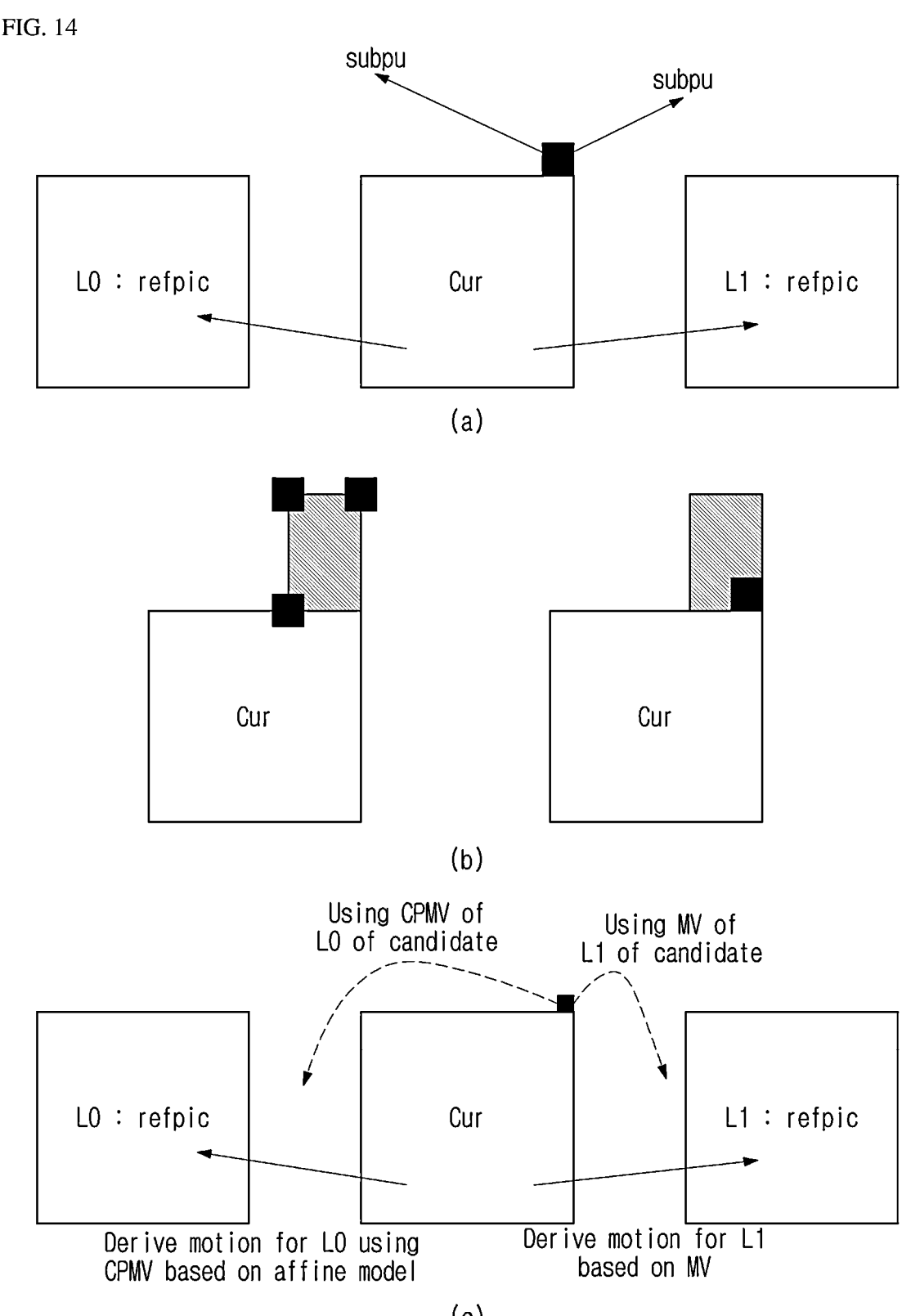

FIG. 13 and FIG. 14 are diagrams for explaining examples of deriving a bidirectional motion information candidate when Embodiment 2-1 is applied to the merge mode.

As illustrated in FIG. 13(a), if a reference block of a current block is encoded by the proposed method (L0: non-sub PU, L1: sub PU), or if the bidirectional motion information of the reference block includes at least one sub PU based motion information, it may be derived as a bidirectional motion information candidate.

Specifically, as illustrated in FIG. 13(b), the L0-direction motion information of the current block (Cur) may be derived by applying an affine model based on the L0-direction CPMV of the reference block, and the L1-direction motion information of the current block may be derived from the L1-direction motion information of the reference block. Accordingly, the bidirectional motion information of the reference block may be derived as a bidirectional motion information candidate.

As another example, as illustrated in FIG. 14(a), if a reference block is bi-predicted and both directions are predicted based on the sub PU prediction type, CPMVs of neighboring blocks are stored in the bidirectional motion information of the reference block (left side of FIG. 14(b)), and at the same time, the motion information (MV) of the reference block itself is also stored (right side of FIG. 14(b)).

Therefore, as illustrated in FIG. 14(c), in this case, the L0-direction motion information of the current block may be derived by applying the affine model based on the CPMV of the reference block, and the MV of the reference block may be used as the L1-direction motion information of the current block. Accordingly, the bidirectional motion information of this reference block may be derived as a bidirectional motion information candidate.

Figure 15:
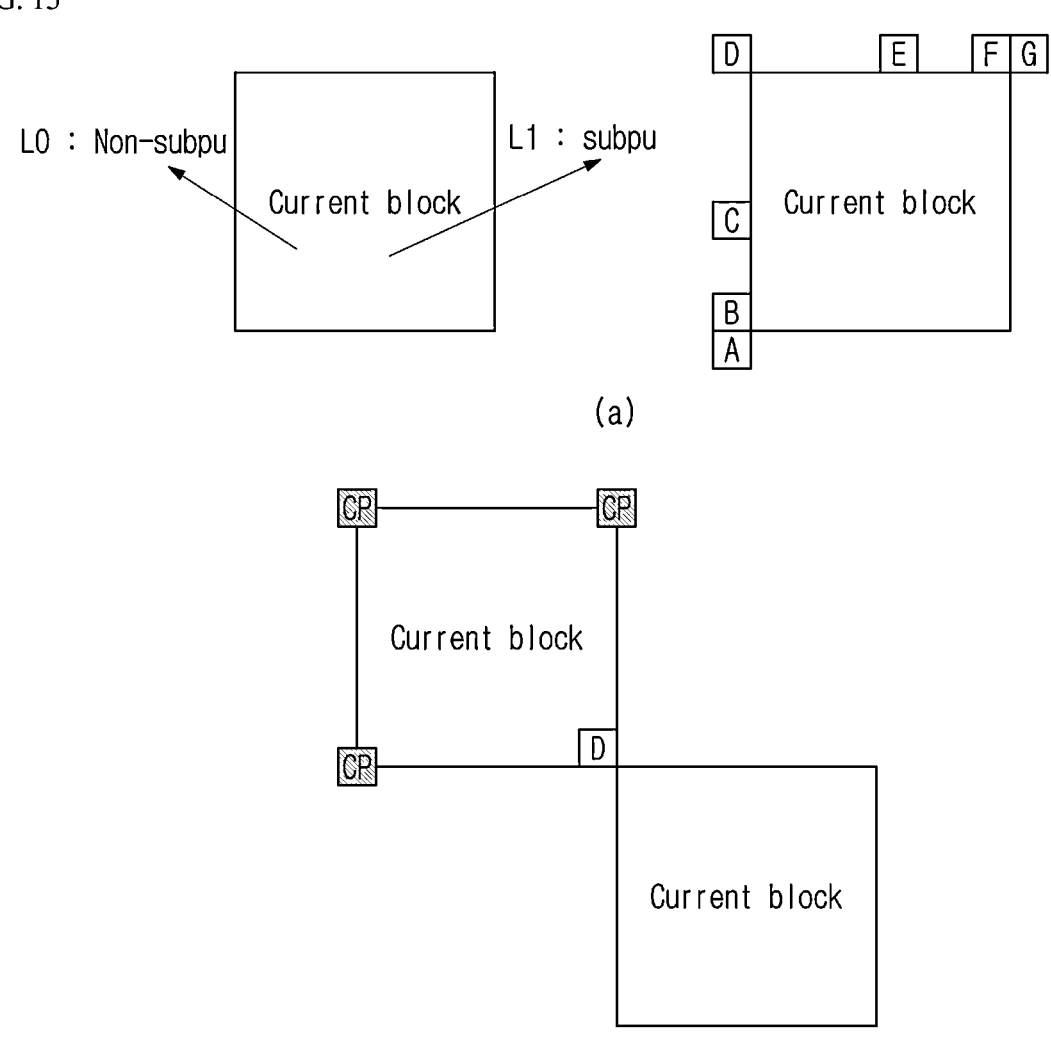

FIG. 15 is a diagram for explaining examples of deriving bidirectional motion information candidates when Embodiment 2-1 is applied to the AMVP mode.

If CPMV is stored, such as when a reference block is decoded by the proposed method or in affine mode, a bidirectional motion information candidate may be derived by combining the motion information (CPMV) with the motion information (MV) stored at the position of the reference block that is not CPMV.

For example, as illustrated in FIG. 15(a), different prediction types may be applied to each prediction direction of the current block (L0: non-sub PU, L1: sub PU), and the positions of reference blocks for constructing bidirectional motion information candidates may be defined as A to G. In addition, motion information for each position (Candidates Position) of the reference blocks may be as shown in Table 1.

TABLE 1

| Candidates Position | L0 | L1 |
|---|---|---|
| A | subPU | non-subPU |
| B | non-subPU | non-subPU |
| C | non-subPU | subPU |
| D | subPU | subPU |
| E | non-subPU | subPU |
| F | non-subPU | subPU |
| G | subPU | non-subPU |

In such an example, among the bidirectional motion information of the reference block, bidirectional motion information suitable for applying the prediction method (prediction type) of the current block may be derived as bidirectional motion information candidates. That is, as shown in Table 2, bidirectional motion information in which the prediction type in the L0 direction is a non-sub PU prediction type and the prediction type in the L1 direction is a sub PU prediction type may be derived as bidirectional motion information candidates.

TABLE 2

| Candidates Position | L0 | L1 |
|---|---|---|
| C | non-subPU | subPU |
| E | non-subPU | subPU |
| F | non-subPU | subPU |

In some embodiments, as illustrated in FIG. 15(*b*), the CPMV (CP) of the neighboring blocks is stored at the D position, and at the same time, the motion information (D) of the reference block itself is also stored, so that the MV of the CP may be used for the sub PU prediction type, and its own motion information may be referenced for the non-sub PU prediction type. Accordingly, the motion information encoded as the sub PU at the D position (i.e., sub PU based motion information) may be processed like the non-sub PU based motion information, and through this processing, the list in Table 2 may be modified as in Table 3 to construct a bidirectional motion information candidate list.

TABLE 3

| Candidates Position | L0 | L1 |
|---|---|---|
| C | non-subPU | subPU |
| D | subPU → non-subPU | subPU |
| E | non-subPU | subPU |
| F | non-subPU | subPU |

As another example, in the example of FIG. 15(*a*), the motion information for each position (Candidates Position) of the reference blocks may be as in Table 4.

TABLE 4

| Candidates Position | L0 | L1 |
|---|---|---|
| A | subPU | non-subPU |
| B | non-subPU | — |
| C | — | subPU |
| D | subPU | subPU |
| E | non-subPU | subPU |
| F | non-subPU | subPU |
| G | subPU | — |

In this case, among the motion information of the reference block, motion information suitable for applying different prediction types of the current block may be derived as bidirectional motion information candidates as shown in Table 5.

TABLE 5

| Candidates Position | L0 | L1 |
|---|---|---|
| D | subPU→non-subPU | subPU |
| E | non-subPU | subPU |
| F | non-subPU | subPU |

Embodiment 2-2

Embodiment 2-2 is an embodiment of deriving a bidirectional motion information candidate of a current block when bidirectional motion information may be derived by decomposing and recombining motion information of a reference block on a prediction direction basis and sub PU based motion information may be derived from at least one direction of the recombined bidirectional motion information. Here, 'a case where sub PU based motion information may be derived from at least one direction' may mean that at least one sub PU based motion information is included in the recombined bidirectional motion information.

Figure 16:
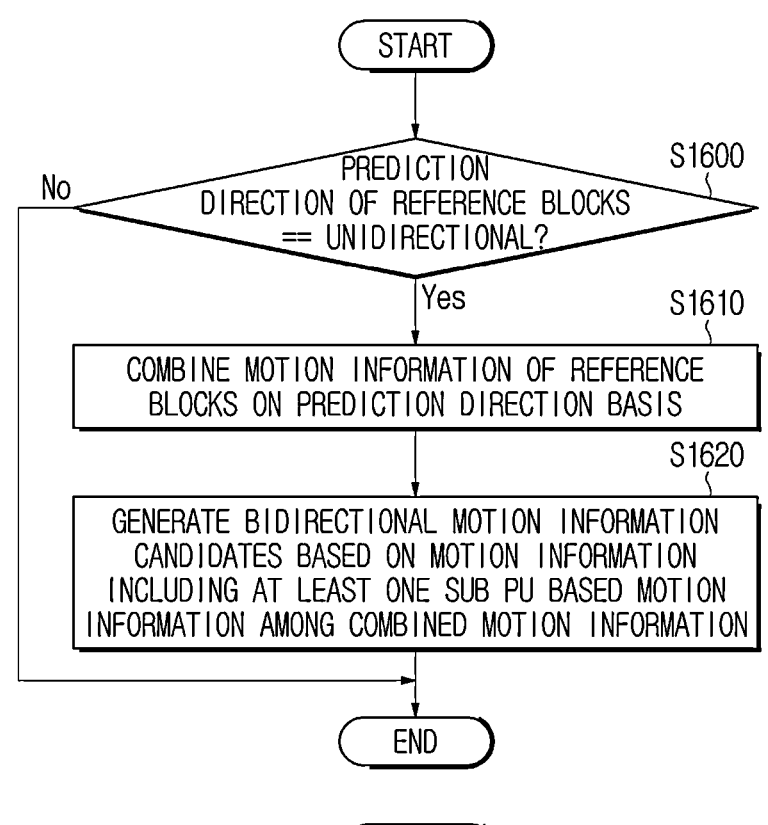
FIG. 16 is a flowchart illustrating an image encoding method and an image decoding method according to another embodiment of the present disclosure.

FIG. 16 is a flowchart illustrating an image encoding method and an image decoding method according to Embodiment 2-2.

Referring to FIG. 16, the image encoding apparatus 100 and the image decoding apparatus 200 may determine a prediction direction of reference blocks (S1600). If the prediction direction of the reference blocks is unidirectional, the image encoding apparatus 100 and the image decoding apparatus 200 may derive combined bidirectional motion information by combining the motion information of the reference blocks on a prediction direction basis (S1610). In addition, the image encoding apparatus 100 and the image decoding apparatus 200 may derive bidirectional motion information candidates based on motion information including at least one sub PU based motion information among the combined bidirectional motion information (S1620).

In some embodiments, steps S1610 and S1620 may be performed independently of step S1610. That is, derivation of combined bidirectional motion information and derivation of bidirectional motion information candidates may be performed without determination of the prediction direction of the reference blocks.

An example of deriving a bidirectional motion information candidate when Embodiment 2-2 is applied to the merge mode will be described below.

As illustrated in FIG. 15(*a*), different prediction types are applied to each prediction direction of the current block (L0: non-sub PU, L1: sub PU), and the positions of reference blocks for constructing bidirectional motion information candidates are defined as A to G. In addition, the motion information for each position (Candidates Position) of the reference blocks may all be unidirectional motion information, as shown in Table 6.

TABLE 6

| Candidates Position | L0 | L1 |
|---|---|---|
| A | subPU | — |
| B | non-subPU | — |
| C | — | subPU |
| D | — | subPU |
| E | — | non-subPU |
| F | non-subPU | — |
| G | subPU | — |

In such a case, the unidirectional motion information of the reference block may be recombined to derive recombined bidirectional motion information, and bidirectional motion information candidates as in Table 7 may be derived from the recombined bidirectional motion information.

TABLE 7

| Candidates Position | L0 | Candidates Position | L1 |
|---|---|---|---|
| 0 | A | subPU→non-subPU | C | subPU |
| 1 | B | non-subPU | D | subPU |
| 2 | F | non-subPU | C | subPU |
| 3 | G | subPU→non-subPU | D | subPU |

An example of deriving a bidirectional motion information candidate when Embodiment 2-2 is applied to the AMVP mode will be described below.

When the positions of the reference blocks are as shown in FIG. 15(*a*) and the motion information of the corresponding reference blocks is as shown in Table 1, the motion information of the reference blocks may be separated by each prediction direction and recombined to derive recombined bidirectional motion information as shown in Table 8. The recombined bidirectional motion information may be used as a bidirectional motion information candidate for bidirectional prediction of the current block.

TABLE 8

| | L0 | | L1 |
|---|---|---|---|
| B | non-subPU | C | subPU |
| C | non-subPU | D | subPU |
| E | non-subPU | E | subPU |
| F | non-subPU | C | subPU |
| B | non-subPU | D | subPU |
| C | non-subPU | E | subPU |
| E | non-subPU | F | subPU |
| F | non-subPU | C | subPU |

Embodiment 2-3

If the motion information of the reference blocks is all non-sub PU based motion information, the motion information for deriving the sub PU based motion information of the current block cannot be referenced from the reference blocks. For example, as shown in FIG. 15(a), if different prediction types are applied for each prediction direction of the current block and the motion information of the reference blocks (A to G) is all non-sub PU motion information, the CPMV for supporting the sub PU prediction type in the L1 direction of the current block cannot be derived.

To solve this problem, Embodiment 2-3 proposes a method of deriving sub PU based motion information of the current block not from a reference block, but from neighboring blocks located around the current block.

To this end, the reference block is divided into adjacent blocks and neighboring blocks. The adjacent blocks may correspond to blocks adjacent to the current block. For example, in FIG. 15(a), blocks A to G adjacent to the current block may correspond to adjacent blocks. In addition, the adjacent blocks may be blocks predefined to be used to derive motion information of the current block. The neighboring blocks are blocks located around the current block, and may be adjacent to the current block or may not be adjacent to the current block. The neighboring blocks may be blocks that do not correspond to adjacent blocks. The reference block may include adjacent blocks and neighboring blocks.

Figure 17:
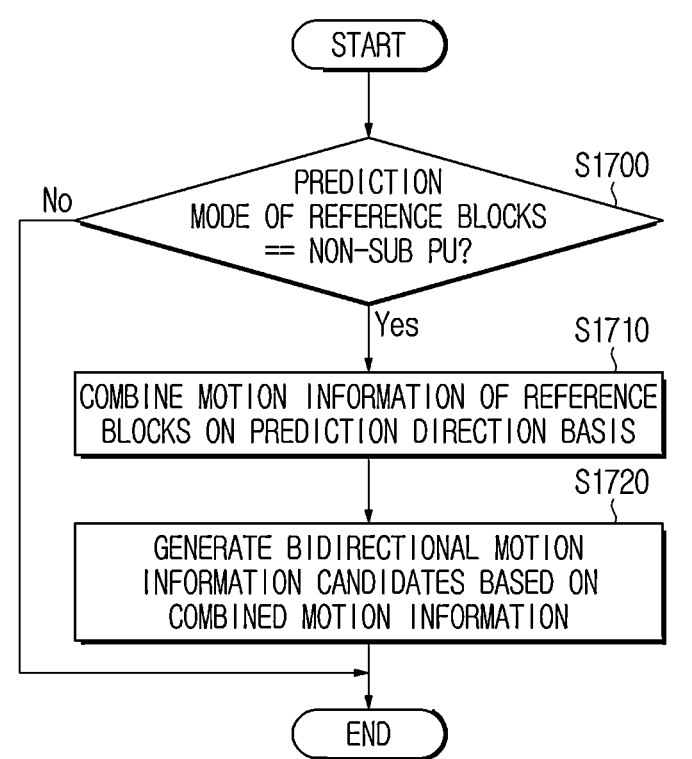
FIG. 17 is a flowchart illustrating an image encoding method and an image decoding method according to another embodiment of the present disclosure.

FIG. 17 is a flowchart illustrating an image encoding method and an image decoding method according to Embodiment 2-3.

Referring to FIG. 17, the image encoding apparatus 100 and the image decoding apparatus 200 may determine prediction types of reference blocks (S1700). If the prediction types of the reference blocks are all non-sub PU, the image encoding apparatus 100 and the image decoding apparatus 200 may derive combined bidirectional motion information by combining the motion information of the reference blocks on a prediction direction basis (S1710). In addition, the image encoding apparatus 100 and the image decoding apparatus 200 may derive bidirectional motion information candidates based on the combined bidirectional motion information (S1720).

Neighboring blocks may include bidirectional motion information. Even if the motion information of the neighboring blocks is not bidirectional, combined bidirectional motion information may be derived by adaptively referencing the motion information on a prediction direction basis.

Figure 18:
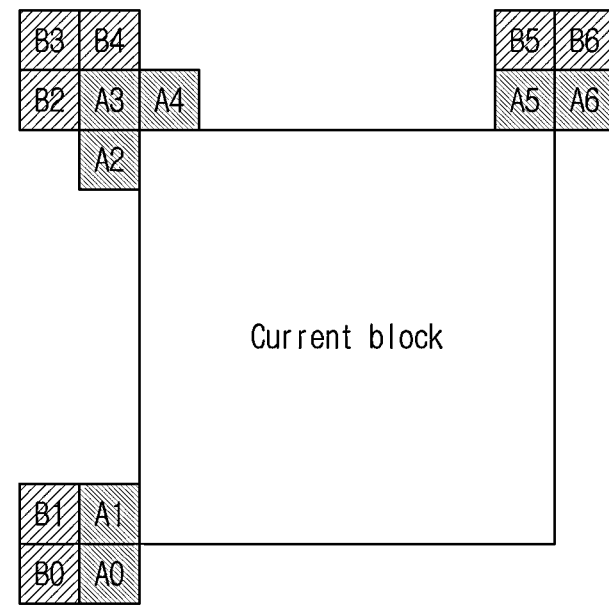
FIG. 18 is a diagram for explaining an example of neighboring blocks which may be used to derive bidirectional motion information candidate.

An example of the neighboring blocks is shown in FIG. 18. As illustrated in FIG. 18, the neighboring blocks may be reconstructed blocks located around the CP positions of the current block. That is, A0, A1, B0, and B1 may be neighboring blocks located around the lower left CP position of the current block, A2, A3, A4, B2, B3, and B4 may be neighboring blocks located around the upper left CP position of the current block, and A5, A6, B5, and B6 may be neighboring blocks located around the upper right CP position of the current block.

In the example of FIG. 18, one motion information for non-sub PU prediction type may be derived for the L0 direction, and two or more CPMVs for sub PU prediction type may be derived for the L1 direction. As a result, a bidirectional motion information candidate (prediction candidate list) may be constructed as shown in Table 9.

TABLE 9

| Candidate | L0(non-subPU) | L1(subPU) |
|---|---|---|
| 0 | MV(A0) | CPMV(A2, A0, A5) |
| 1 | MV(A4) | CPMV(A2, A1, A6) |
| 2 | MV(B5) | CPMV(A3, A0, A6) |
| 3 | MV(B0) | CPMV(B2, B0, B6) |
| . . . | | |

In Table 9, the information in the parentheses of MV ( ) and CPMV ( ) may indicate the positions of the neighboring blocks shown in FIG. 18. That is, as shown in Table 9, non-sub PU based motion information for the L0 direction may be derived using the motion information of the neighboring blocks, and sub PU based motion information for the L1 direction may be derived using CPMV that combines the motion information of the neighboring blocks.

Embodiment 3

In order to apply different prediction types for each prediction direction by the method of the present disclosure, syntax elements to support this need to be signaled. Embodiment 3 is an embodiment of a method of signaling syntax elements.

Figure 19:
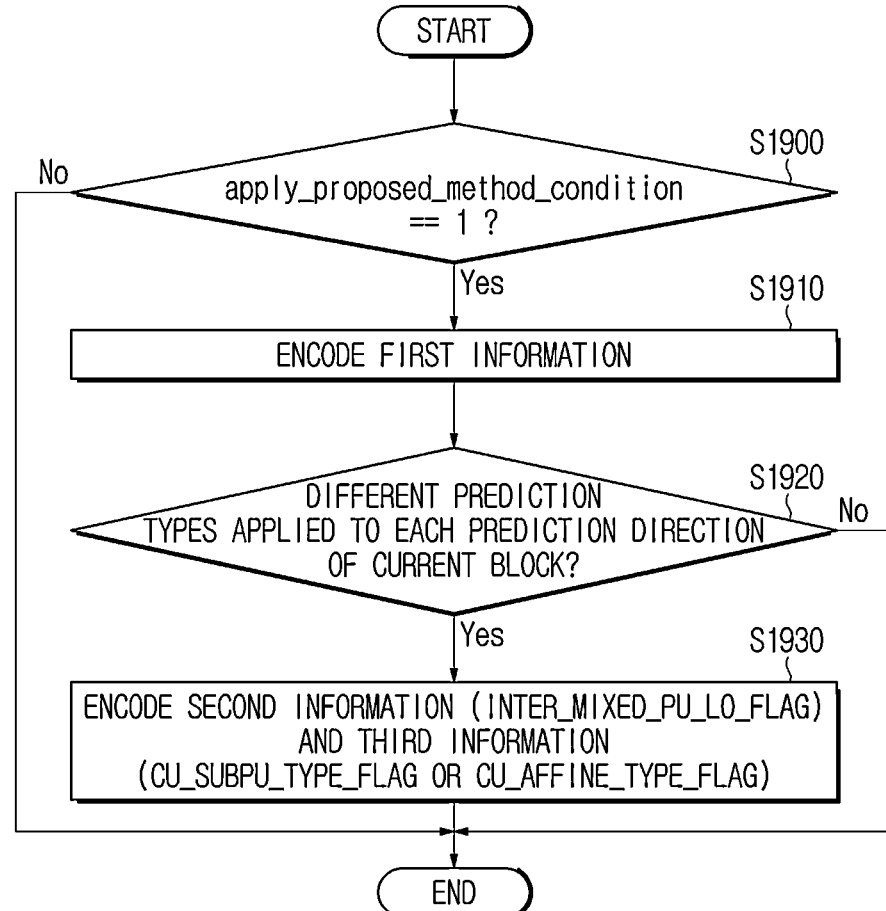
FIG. 19 is a flowchart illustrating an image encoding method according to another embodiment of the present disclosure.

FIG. 19 is a flowchart illustrating an image encoding method according to Example 3.

Referring to FIG. 19, the image encoding apparatus 100 may determine whether a first condition (apply_proposed_method_condition) is satisfied (S1900). The first condition is a condition for whether to apply the method of the present disclosure, and may include whether a prediction direction of a current block is bidirectional. The specific contents of the first condition will be described later.

The image encoding apparatus 100 may encode first information into a bitstream when the first condition is satisfied (S1910). Here, the first information may be encoded as merge_mixed_pu_flag or inter_mixed_pu_flag. The image encoding apparatus 100 may determine whether different prediction types are applied to each prediction direction of the current block (S1920).

In addition, upon determining that different prediction types are applied to each prediction direction of the current block, the image encoding apparatus 100 may encode second information (inter_mixed_pu_l0_flag) and third information (cu_subpu_type_flag) (S1930). In some embodiments, step S1930 may be performed only when the prediction mode of the current block is a AMVP mode. That is, the second information and the third information may be encoded when the prediction mode of the current block is the AMVP mode.

Figure 20:
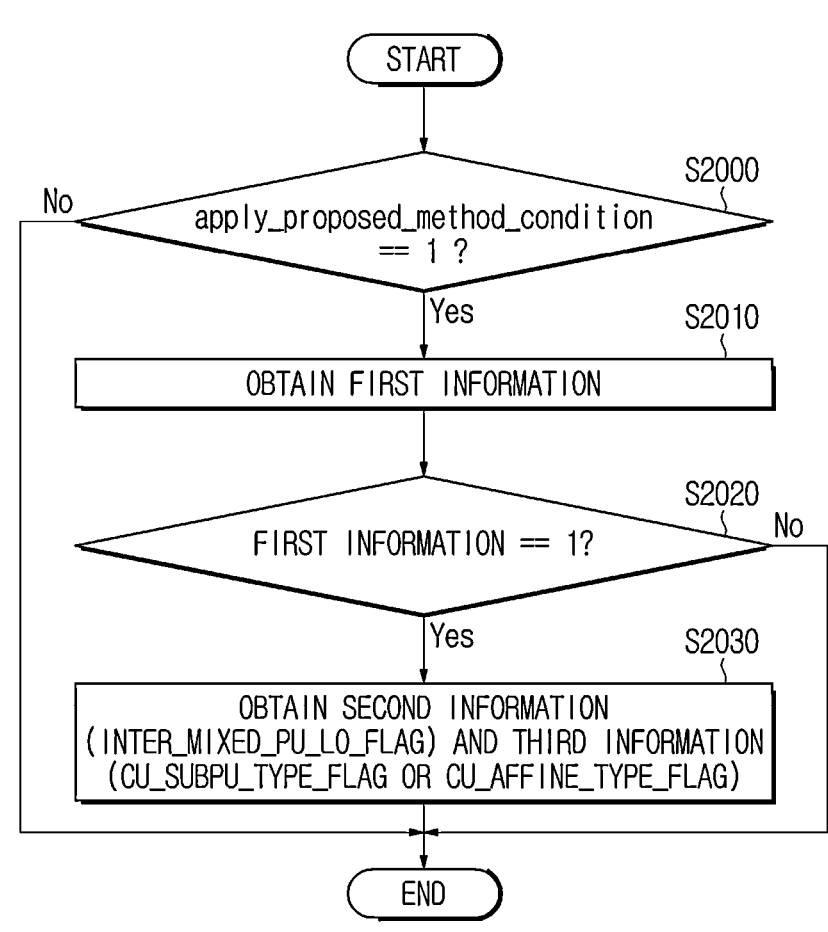
FIG. 20 is a flowchart illustrating an image decoding method according to another embodiment of the present disclosure.

FIG. 20 is a flowchart illustrating an image decoding method according to Embodiment 3.

Referring to FIG. 20, the image decoding apparatus 200 may determine whether a first condition (apply_proposed_method_condition) is satisfied (S2000). The first condition is a condition for whether to apply the method of the present disclosure, and may include whether a prediction direction of a current block is bidirectional. The specific contents of the first condition will be described later.

If the first condition is satisfied, the image decoding apparatus 200 may obtain first information (merge_mixed_pu_flag or inter_mixed_pu_flag) from a bitstream (S2010). The image decoding apparatus 200 may determine whether different prediction types are applied to each prediction direction of the current block based on the first information (S2020).

When the first information indicates that different prediction types are applied to each prediction direction of the current block, the image decoding apparatus 200 may obtain second information (inter_mixed_pu_10_flag) and third information (cu_subpu_type_flag) from the bitstream (S2030). In some embodiments, step S2030 may be performed only when the prediction mode of the current block is a AMVP mode. That is, the second information and the third information may be obtained when the prediction mode of the current block is the AMVP mode.

Embodiment 3 may be divided into 1) an embodiment performed like a conventional merge mode in which other information is not signaled (except for index information) (Embodiment 3-1) and 2) an embodiment performed like a conventional AMVP mode in which other information is signaled (Embodiment 3-2).

Embodiment 3-1

An example of the syntax structure according to Embodiment 3-1 is shown in Table 10.

TABLE 10

| | De-scriptor |
|---|---|
| merge_data( x0, y0, cbWidth, cbHeight, chType ) { | |
| if( CuPredMode[ chType ][ x0 ][ y0 ] = = MODE_IBC ) { | |
| if( MaxNumIbcMergeCand > 1 ) | |
| merge_idx[ x0 ][ y0 ] | ae(v) |
| } else { | |
| if (apply_proposed_method_condition) { | |
| merge_mixed_pu_flag[ x0 ][ y0 ] | ae(v) |
| } | |
| if(merge_mixed_pu_flag[ x0 ][ y0 ] == 0 && | |
| MaxNumSubblockMergeCand > 0 && cbWidth >= 8 && | |
| cbHeight >= 8 ) | |
| merge_subblock_flag[ x0 ][ y0 ] | ae(v) |
| if (merge_mixed_pu_flag[ x0 ][ y0 ] == 1) { | |
| if(MaxNumCombinedSubblockMergeCand > 1){ | |
| merge_mixed_pu_idx[ x0 ][ y0 ] | ae(v) |
| } | |
| } | |
| else if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |
| if( cbWidth < 128 && cbHeight < 128 && | |
| ( ( sps_ciip_enabled_flag && cu_skip_flag[ x0 ][ y0 ] = = | |
| 0 && | |
| ( cbWidth * cbHeight) >= 64 ) || | |
| ( sps_gpm_enabled_flag && | |
| sh_slice_type = = B && cbWidth >= 8 && | |
| cbHeight >= 8 && | |
| cbWidth < (8 * cbHeight ) && cbHeight < | |
| ( 8 * cbWidth ) ) ) ) | |
| regular_merge_flag[ x0 ][ y0 ] | ae(v) |
| if( regular_merge_flag[ x0 ][ y0 ] = = 1 ) { | |

TABLE 10-continued

| | De-scriptor |
|---|---|
| if( sps_mmvd_enabled_flag ) | |
| mmvd_merge_flag[ x0 ][ y0 ] | ae(v) |
| if( mmvd_merge_flag[ x0 ][ y0 ] = = 1 ) { | |
| if( MaxNumMergeCand > 1 ) | |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else if( MaxNumMergeCand > 1 ) | |
| merge_idx[ x0 ][ y0 ] | ae(v) |
| } else { | |
| if( sps_ciip_enabled_flag && sps_gpm_enabled_flag && | |
| sh_slice_type = = B && | |
| cu_skip_flag[ x0 ][ y0 ] = = 0 && cbWidth >= 8 | |
| && cbHeight >= 8 && | |
| cbWidth < ( 8 * cbHeight ) && cbHeight < | |
| ( 8 * cbWidth ) && | |
| cbWidth < 128 && cbHeight < 128 ) | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| } | |
| } | |
| } | |
| } | |
| } | | merge_idx may indicate a merge candidate in a merge candidate list. merge_mixed_pu_flag is first information, and may be encoded and obtained when a first condition (apply_proposed_method_condition) is satisfied. The first information may indicate whether different prediction types are applied to each prediction direction of a current block. merge_mixed_pu_flag=1 may indicate that different prediction types are applied to each prediction direction of the current block, and merge_mixed_pu_flag=0 may indicate that different prediction types are not applied to each prediction direction of the current block.

In the case where merge_mixed_pu_flag=1, since the prediction block is generated by applying the method proposed by the present disclosure, information such as merge_subblock_flag or regular_merge_flag, which were additionally signaled to support the conventional method, may not be signaled. That is, merge_subblock_flag may be signaled when the method proposed by the present disclosure is not applied (merge_mixed_pu_flag=0).

regular_merge_flag may indicate whether the merge mode (regular merge mode) is applied to the current block. regular_merge_flag=1 may indicate that the regular merge mode is used to generate inter prediction parameters of the current block.

merge_subblock_flag may indicate whether a subblock merge mode (or affine merge mode) is applied to the current block. That is, merge_subblock_flag may indicate whether the subblock merge mode is used to generate subblock-based inter prediction parameters for the current block. merge_subblock_idx may indicate a merge candidate index of a subblock-based merge candidate list.

Index information (merge_mixed_pu_idx) may indicate a bidirectional motion information candidate used for prediction of the current block among at least one bidirectional motion information candidate. The index information may be signaled when the maximum number (MaxNumCombinedSubblockMergeCand) of prediction candidates (bidirectional motion information candidates) for the method proposed by the present disclosure exceeds 1. That is, when the maximum number of prediction candidates is 1 or less, prediction may be performed using one bidirectional motion information candidate without signaling the index information.

mmvd_merge_flag may indicate whether MMVD (merge mode with motion vector difference) mode is applied to the current block. mmvd_merge_flag=1 may indicate that the MMVD mode is used to generate inter prediction parameters of the current block. mmvd_cand_flag may indicate whether a first candidate (0) or a second candidate (1) in a merging candidate list is used with the MVD derived from mmvd_distance_idx and mmvd_direction_idx. mmvd_distance_idx may indicate an index used for deriving a variable MmvdDistance [x0][y0], and mmvd_direction_idx may indicate an index used for deriving a variable MmvdSign [x0][y0].

ciip_flag may indicate whether a combined inter-picture merge and intra-picture prediction mode is applied to the current block. merge_gpm_partition_idx may indicate the partitioning shape of the GPM mode (geometric partitioning merge mode), and merge_gpm_idx0 and merge_gpm_idx1 may indicate first and second candidates in the GPM-based motion compensation candidate list, respectively.

An example of the syntax structure according to Embodiment 3-1 is shown in Table 11.

TABLE 11

| | De-scriptor |
|---|---|
| merge_data( x0, y0, cbWidth, cbHeight, chType ) { | |
| if( CuPredMode[ chType ][ x0 ][ y0 ] = = MODE_IBC ) { | |
| if( MaxNumIbcMergeCand > 1 ) | |
| merge_idx[ x0 ][ y0 ] | ae(v) |
| } else { | |
| if( MaxNumSubblockMergeCand > 0 && cbWidth >= 8 && cbHeight >= 8 ) | |
| merge_subblock_flag[ x0 ][ y0 ] | ae(v) |
| if( merge_subblock_flag[ x0 ][ y0 ] = = 1 ) { | |
| if(apply_proposed_method_condition) | |
| merge_mixed_pu_flag[ x0 ][ y0 ] | ae(v) |
| if( MaxNumSubblockMergeCand > 1 ) | |
| merge_subblock_idx[ x0 ][ y0 ] | ae(v) |
| } else { | |
| if( cbWidth < 128 && cbHeight < 128 && | |
| ( ( sps_ciip_enabled_flag && cu_skip_flag[ x0 ][ y0 ] = = 0 && | |
| ( cbWidth * cbHeight ) >= 64 ) \|\| | |
| ( sps_gpm_enabled_flag && | |
| sh_slice_type = = B && cbWidth >= 8 && cbHeight >= 8 && | |
| cbWidth < ( 8 * cbHeight ) && cbHeight < ( 8 * cbWidth ) ) ) ) | |
| regular_merge_flag[ x0 ][ y0 ] | ae(v) |
| if( regular_merge_flag[ x0 ][ y0 ] = = 1 ) { | |
| if( sps_mmvd_enabled_flag ) | |
| mmvd_merge_flag[ x0 ][ y0 ] | ae(v) |
| if( mmvd_merge_flag[ x0 ][ y0 ] = = 1 ){ | |
| if( MaxNumMergeCand > 1 ) | |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else if( MaxNumMergeCand > 1 ) | |
| merge_idx[ x0 ][ y0 ] | ae(v) |
| } else { | |
| if( sps_ciip_enabled_flag && sps_gpm_enabled_flag && | |
| sh_slice_type = = B && | |
| cu_skip_flag[ x0 ][ y0 ] = = 0 && cbWidth >= 8 | |

TABLE 11-continued

| | De-scriptor |
|---|---|
| && cbHeight >= 8 && | |
| cbWidth < ( 8 * cbHeight ) && cbHeight < ( 8 * cbWidth ) && | |
| cbWidth < 128 && cbHeight < 128 ) | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| } | |
| } | |
| } | |
| } | |

The syntax structure of Table 11 is an example in which the method proposed by the present disclosure is syntactically fused with a conventional coding tool (e.g., subblock merge mode). That is, when the subblock merge mode is applied (merge_subblock_flag=1), it is determined whether a first condition (apply_proposed_method_condition) is satisfied, and if the first condition is satisfied, whether the method proposed by the present disclosure is applied (merge_mixed_pu_flag) may be determined. In addition, in the example of Table 11, the function of the index information (merge_mixed_pu_idx) may be performed by merge_subblock_idx.

Another example of the syntax structure according to Embodiment 3-1 is shown in Table 12.

TABLE 12

| | Descriptor |
|---|---|
| merge_data( x0, y0, cbWidth, cbHeight, chType ) { | |
| if( CuPredMode[ chType ][ x0 ][ y0 ] = = MODE_IBC ) { | |
| if( MaxNumIbcMergeCand > 1 ) | |
| merge_idx[ x0 ][ y0 ] | ae(v) |
| } else { | |
| if (apply_proposed_method_condition) { | |
| merge_mixed_pu_flag[ x0 ][ y0 ] | ae(v) |
| } | |
| if(merge_mixed_pu_flag[ x0 ][ y0 ] == 0 && MaxNumSubblockMergeCand > 0 && cbWidth >= 8 && cbHeight >= 8 ) | |
| merge_subblock_flag[ x0 ][ y0 ] | ae(v) |
| else if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |

The syntax structure of Table 12 is an example in which index information for selecting a bidirectional motion information candidate is not signaled. Specifically, according to Table 12, if (merge_mixed_pu_flag==1) and if (MaxNumCombinedSubblcokMergeCand>1) of Table 11 are not performed, and merge_mixed_pu_idx of Table 11 may not be signaled. In this case, the bidirectional motion information candidate used for prediction of the current block is determined based on the cost according to template matching, and may be determined as a bidirectional motion information candidate having the minimum cost, for example.

Embodiment 3-2

An example of the syntax structure according to Embodiment 3-2 is shown in Table 13.

TABLE 13

```
coding_unit( x0, y0, cbWidth, cbHeight, cqtDepth, treeType, modeType ) {
.....
if( CuPredMode[ chType ][ x0 ][ y0 ] = = MODE_INTRA ||
    CuPredMode[ chType ][ x0 ][ y0 ] = = MODE_PLT ) {
.... (Intra)
} else if( treeType != DUAL_TREE_CHROMA ) { /* MODE_INTER or
MODE_IBC */
if( cu_skip_flag[ x0 ][ y0 ] = = 0 )
... (merge)
} else {
if( sh_slice_type = = B )
inter_pred_idc[ x0 ][ y0 ]                                          ae(v)
if(apply_proposed_method_condition){
inter_mixed_pu_flag[ x0 ][ y0]                                      ae(v)
if( inter_mixed_pu_flag[ x0 ][ y0 ] ){
inter_mixed_pu_l0_flag[ x0 ][ y0 ]                                  ae(v)
cu_subpu_type_flag[ x0 ][ y0 ]                                      ae(v)
}
}
else if( sps_affine_enabled_flag && cbWidth >= 16 && cbHeight >=
16 ) {
inter_affine_flag[ x0 ][ y0 ]                                       ae(v)
if( sps_6param_affine_enabled_flag && inter_affine_flag[ x0 ][ y0 ] )
cu_affine_type_flag[ x0 ][ y0 ]                                     ae(v)
}
if( sps_smvd_enabled_flag && !ph_mvd_l1_zero_flag &&
    inter_pred_idc[ x0 ][ y0 ] = = PRED_BI &&
    !inter_affine_flag[ x0 ][ y0 ] && RefIdxSymL0 > −1 &&
RefIdxSymL1 > −1 )
sym_mvd_flag[ x0 ][ y0 ]                                            ae(v)
if( inter_pred_idc[ x0 ][ y0 ] != PRED_L1 ) {
if( NumRefIdxActive[ 0 ] > 1 && !sym_mvd_flag[ x0 ][ y0 ] )
ref_idx_l0[ x0 ][ y0 ]                                              ae(v)
mvd_coding( x0, y0, 0, 0 )
if( MotionModelIdc[ x0 ][ y0 ] > 0 )
mvd_coding( x0, y0, 0, 1 )
if(MotionModelIdc[ x0 ][ y0 ] > 1 )
mvd_coding(x0, y0, 0, 2 )
mvp_l0_flag[ x0 ][ y0 ]                                             ae(v)
} else {
MvdL0[ x0 ][ y0 ][ 0 ] = 0
MvdL0[ x0 ][ y0 ][ 1 ] = 0
}
if( inter_pred_idc[ x0 ][ y0 ] != PRED_L0 ) {
if( NumRefIdxActive[ 1 ] > 1 && !sym_mvd_flag[ x0 ][ y0 ] )
ref_idx_l1[ x0 ][ y0 ]                                             ae(v)
if( ph_mvd_l1_zero_flag && inter_pred_idc[ x0 ][ y0 ] = = PRED_BI ) {
MvdL1[ x0 ][ y0 ][ 0 ] = 0
MvdL1[ x0 ][ y0 ][ 1 ] = 0
MvdCpL1[ x0 ][ y0 ][ 0 ][ 0 ] = 0
MvdCpL1[ x0 ][ y0 ][ 0 ][ 1 ] = 0
MvdCpL1[ x0 ][ y0 ][ 1 ][ 0 ] = 0
MvdCpL1[ x0 ][ y0 ][ 1 ][ 1 ] = 0
MvdCpL1[ x0 ][ y0 ][ 2 ][ 0 ] = 0
MvdCpL1[ x0 ][ y0 ][ 2 ][ 1 ] = 0
} else {
if( sym_mvd_flag[ x0 ][ y0 ] ) {
MvdL1[ x0 ][ y0 ][ 0 ] = −MvdL0[ x0 ][ y0 ][ 0 ]
MvdL1[ x0 ][ y0 ][ 1 ] = −MvdL0[ x0 ][ y0 ][ 1 ]
} else
mvd_coding( x0, y0, 1, 0 )
if( MotionModelIdc[ x0 ][ y0 ] > 0 )
mvd_coding( x0, y0, 1, 1 )
if(MotionModelIdc[ x0 ][ y0 ] > 1 )
mvd_coding( x0, y0, 1, 2 )
}
mvp_l1_flag[ x0 ][ y0 ]                                            ae(v)
} else {
MvdL1[ x0 ][ y0 ][ 0 ] = 0
MvdL1[ x0 ][ y0 ][ 1 ] = 0
}
``` inter_mixed_pu_flag is first information, and may be encoded and obtained when the first condition (apply_proposed_method_condition) is satisfied. The first information may indicate whether different prediction types are applied to each prediction direction of the current block. inter_mixed_pu_flag=1 may indicate that different prediction types are applied to each prediction direction of the current block, and inter_mixed_pu_flag=0 may indicate that different prediction types are not applied to each prediction direction of the current block.

Second information (inter_mixed_pu_l0_flag) may be signaled when different prediction types are applied to each prediction direction of the current block (inter_mixed_pu_flag=1). inter_mixed_pu_l0_flag may indicate different prediction types applied to each prediction direction. For example, inter_mixed_pu_l0_flag=1 may indicate that the prediction type applied to the L0 direction is a sub PU prediction type, and inter_mixed_pu_l0_flag=0 may indicate that the prediction type applied to the L0 direction is a non-sub PU prediction type. As another example, inter_mixed_pu_l0_flag=1 may indicate that the prediction type applied to the L0 direction is a non-sub PU prediction type, and inter_mixed_pu_l0_flag=0 may indicate that the prediction type applied to the L0 direction is a sub PU prediction type.

Third information (cu_subpu_type_flag) may be signaled when different prediction types are applied to each prediction direction of the current block (inter_mixed_pu_flag=1). cu_subpu_type_flag may be used to determine the parameter model applied to each prediction direction, and the determination of the parameter model will be described later.

inter_affine_flag may indicate whether an affine mode is applied to the current block. cu_affine_type_flag may indicate the parameter model applied to the current block. For example, cu_affine_type_flag=1 may indicate that a 6-parameter model is applied, and cu_affine_type_flag=0 may indicate that a 4-parameter model is applied.

sym_mvd_flag may indicate whether symmetric MVD is used in MVD coding. For example, sym_mvd_flag=1 may indicate that ref_idx_l0, ref_idx_l1, and mvd_coding are not present. ref_idx_l0 may indicate a reference picture in reference picture list 0 (in the L0 direction), and ref_idx_l1 may indicate a reference picture in reference picture list 1 (in the L1 direction).

mvp_l0_flag may indicate a candidate selected from among candidates in the MVP candidate list 0 to derive the MVP of the current block when the MVP mode is applied, and mvp_l1_flag may indicate a candidate selected from among candidates in the MVP candidate list 1 to derive the MVP of the current block when the MVP mode is applied.

Another example of the syntax structure according to Embodiment 3-2 is shown in Table 14.

TABLE 14

```
coding_unit( x0, y0, cbWidth, cbHeight, cqtDepth, treeType, modeType ) {
.....
if( CuPredMode[ chType ][ x0 ][ y0 ] = = MODE_INTRA ||
    CuPredMode[ chType ][ x0 ][ y0 ] = = MODE_PLT ) {
.... (Intra)
} else if( treeType != DUAL_TREE_CHROMA ) { /* MODE_INTER or
MODE_IBC */
if( cu_skip_flag[ x0 ][ y0 ] = = 0 )
... (merge)
} else {
if( sh_slice_type = = B )
inter_pred_idc[ x0 ][ y0 ]                                          ae(v)
if(sps_affine_enabled_flag && cbWidth >= 16 && cbHeight >= 16) {
inter_affine_flag[ x0 ][ y0 ]                                       ae(v)
if( inter_affine_flag[ x0 ][ y0 ] && inter_pred_idc[ x0 ][ y0 ] = = PRED_BI ) {
inter_mixed_pu_flag[ x0 ][ y0 ]                                     ae(v)
if(inter_mixed_pu_flag[x0 ][ y0 ])
inter_mixed_pu_l0_flag[ x0 ][ y0 ]                                  ae(v)
}
if( sps_6param_affine_enabled_flag && inter_affine_flag[ x0 ][ y0 ] )
cu_affine_type_flag[ x0 ][ y0 ]                                     ae(v)
}
if( sps_smvd_enabled_flag && !ph_mvd_l1_zero_flag &&
      inter_pred_idc[ x0 ][ y0 ] = = PRED_BI
&& !inter_affine_flag[ x0 ][ y0] && RefIdxSymL0 > −1 && RefIdxSymL1
> −1 )
sym_mvd_flag[ x0 ][ y0 ]                                            ae(v)
if( inter_pred_idc[ x0 ][ y0 ] != PRED_L1 ) {
if( NumRefIdxActive[ 0 ] > 1 && !sym_mvd_flag[ x0 ][ y0 ] )
ref_idx_l0[ x0 ][ y0 ]                                              ae(v)
mvd_coding( x0, y0, 0, 0 )
if( MotionModelIdc[ x0 ][ y0 ] > 0 )
mvd_coding( x0, y0, 0, 1 )
if(MotionModelIdc[ x0 ][ y0 ] > 1 )
mvd_coding( x0, y0, 0, 2 )
mvp_l0_flag[ x0 ][ y0 ]                                             ae(v)
} else {
MvdL0[ x0 ][ y0 ][ 0 ] = 0
MvdL0[ x0 ][ y0 ][ 1 ] = 0
1
if( inter_pred_idc[ x0 ][ y0 ] != PRED_L0 ) {
if( NumRefIdxActive[ 1 ] > 1 && !sym_mvd_flag[ x0 ][ y0 ] )
ref_idx_l1[ x0 ][ y0 ]                                              ae(v)
if( ph_mvd_l1_zero_flag && inter_pred_idc[ x0 ][ y0 ] = = PRED_BI ) {
MvdL1[ x0 ][ y0 ][ 0 ] = 0
MvdL1[ x0 ][ y0 ][ 1 ] = 0
```

TABLE 14-continued

```
MvdCpL1[ x0 ][ y0 ][ 0 ][ 0 ] = 0
MvdCpL1[ x0 ][ y0 ][ 0 ][ 1 ] = 0
MvdCpL1[ x0 ][ y0 ][ 1 ][ 0 ] = 0
MvdCpL1[ x0 ][ y0 ][ 1 ][ 1 ] = 0
MvdCpL1[ x0 ][ y0 ][ 2 ][ 0 ] = 0
MvdCpL1[ x0 ][ y0 ][ 2 ][ 1 ] = 0
} else {
if( sym_mvd_flag[ x0 ][ y0 ] ) {
MvdL1[ x0 ][ y0 ][ 0 ] = −MvdL0[ x0 ][ y0 ][ 0 ]
MvdL1[ x0 ][ y0 ][ 1 ] = −MvdL0[ x0 ][ y0 ][ 1 ]
} else
mvd_coding( x0, y0, 1, 0 )
if( MotionModelIdc[ x0 ][ y0 ] > 0 )
mvd_coding( x0, y0, 1, 1 )
if(MotionModelIdc[ x0 ][ y0 ] > 1 )
mvd_coding( x0, y0, 1, 2 )
}
mvp_l1_flag[ x0 ][ y0 ]                                    ae(v)
} else {
MvdL1[ x0 ][ y0 ][ 0 ] = 0
MvdL1[ x0 ][ y0 ][ 1 ] = 0
}
```

The syntax structure of Table 14 is an example in which the method proposed by the present disclosure is syntactically fused with a conventional coding tool (e.g., affine mode). When inter_affine_flag=1, the sub PU prediction mode may be applied to the current block. Accordingly, if the prediction direction of the current block is bidirectional (inter_pred_idc==PRED_BI), whether to apply different prediction types to each prediction direction (inter_mixed_pu_flag) and which prediction type is applied to each prediction direction may be signaled. In addition, in the example of Table 13, the function of the third information (cu_subpu_type_flag) may be performed by cu_affine_type_flag.

An example of a method of determining different prediction types for each prediction direction based on the second information (inter_mixed_pu_10_flag) is shown in Table 15.

TABLE 15

| inter_mixed_pu_flag | inter_mixed_pu_10_flag | decoding |
|---|---|---|
| 0 | X | subpu processing for bi-direction |
| 1 | 0 | L0 subpu processing + L1 non-subpu processing |
| 1 | 1 | L0 non-subpu processing + L1 subpu processing |

Referring to Table 15, if inter_mixed_pu_flag=0, inter_mixed_pu_10_flag is not signaled, and both directions of the current block may be determined based on a sub PU prediction type. If inter_mixed_pu_flag=1 and inter_mixed_pu_10_flag=0, the L0 direction of the current block is determined based on a sub PU prediction type, and the L1 direction of the current block may be determined based on a non-sub PU prediction type. If inter_mixed_pu_flag=1 and inter_mixed_pu_10_flag=1, the L0 direction of the current block is determined based on a non-sub PU prediction type, and the L1 direction of the current block may be determined based on a sub PU prediction type.

In some embodiments, the first information may indicate whether different prediction types are applied for each prediction direction, and may also indicate different prediction types applied for each prediction direction. In other words, the first information may further indicate different prediction types applied for each prediction direction. To this end, the first information may be expressed in an index form (inter_mixed_pu_idc) as in Table 16, rather than in the flag form described above.

TABLE 16

| .... | |
|---|---|
| inter_mixed_pu_idc[ x0 ][ y0 ] | ae(v) |
| .... | |

An example of whether to apply different prediction types for each prediction direction and a method of determining different prediction types for each prediction direction based on the first information in the form of an index is shown in Table 17.

TABLE 17

| inter_mixed_pu_idc[x0][y0] | decoding |
|---|---|
| 0 | subpu processing for bi-direction |
| 10 | L0 subpu processing + L1 non-subpu processing |
| 11 | L0 non-subpu processing + L1 subpu processing |

Referring to Table 17, when inter_mixed_pu_idc=0, both directions of the current block may be determined based on a sub PU prediction type. When inter_mixed_pu_idc=10, the L0 direction of the current block may be determined based on a sub PU prediction type and the L1 direction of the current block may be determined based on a non-sub PU prediction type. When inter_mixed_pu_idc=11, the L0 direction of the current block may be determined based on a non-sub PU prediction type and the L1 direction of the current block may be determined based on a sub PU prediction type.

Embodiment 4

Embodiment 4 is an embodiment of various examples of a first condition (apply_proposed_method_condition).

The first condition may be configured to include the following conditions. That is, when the following conditions are satisfied, first information (merge_mixed_pu_flag or inter_mixed_pu_flag) may be encoded and obtained.

Condition 1. Whether the current block generates a prediction block through Bi-prediction Condition 1 is whether the prediction direction of the current block is bidirectional. For example, Condition 1 is whether inter_pred_idc [x0][y0]==PRED_BI is satisfied.

Condition 2. Whether the size of the current block satisfies a predefined size

Condition 2 is whether the size (cbWidth, cbHeight) of the current block satisfies a predetermined size. For example, condition 2 may include cbWidth>=minimum value of width (MIN_COMB_PU_WIDTH), cbHeight>=minimum value of height (MIN_COMB_PU_HEIGHT), cbWidth<= maximum value of width (MAX_COMB_PU_WIDTH), and cbHeight<=maximum value of height (MAX_COMB_PU_HEIGHT).

MIN_COMB_PU_WIDTH, MIN_COMB_PU_HEIGHT, MAX_COMB_PU_WIDTH, and MAX_COMB_PU_HEIGHT may be predefined values or values signaled from the higher level of the bitstream. Additionally, the values of MIN_COMB_PU_WIDTH, MIN_COMB_PU_HEIGHT, MAX_COMB_PU_WIDTH, and MAX_COMB_PU_HEIGHT may have values within the range of the minimum/maximum block sizes supported by the compression technology.

Condition 3. Whether the method proposed by the present disclosure is supported at a higher level (such as SPS, PPS, PH, SH)

Whether the method proposed by the present disclosure is supported may be defined by a syntax element (comb_sub-pu_enable_flag) signaled from a higher level, and Condition 3 may be satisfied when comb_subpu_enable_flag=1.

Condition 4. Whether the MVD signaling of a specific prediction direction is supported at a higher level (such as SPS, PPS, PH, SH)

Whether the MVD signaling of a specific prediction direction is supported may be defined by a syntax element (ph_mvd_11_zero_flag) signaled from a higher level, and Condition 4 may be satisfied when ph_mvd_11_zero_flag=0 (MVD is signaled).

Embodiment 5

Embodiment 5 is an embodiment of a method of adaptively signaling MVD for each prediction direction.

In the conventional AMVP mode, the index (mvp_lx_flag) of the prediction candidate, the index (ref_idx_lx) of the reference picture, and the offset (MvdLx, mvdCpLX) of the motion information may be encoded and signaled in the bitstream. If the prediction type in a specific direction of the current block is a sub PU prediction type (e.g., affine), at least two MVDs, i.e., mvdCpLX, of each control point (CP) may be signaled. Therefore, the amount of bits of signaled information may have many disadvantages compared to the non-sub PU prediction type (e.g., non-affine). Furthermore, since the same prediction type is applied to each prediction direction in the conventional method, the amount of signaled information may further increase in the case of bi-prediction.

In the method proposed by the present disclosure, since different prediction types (sub PU prediction type and non-sub PU prediction type) are applied for each prediction direction, the amount of bits signaled in the case of bi-prediction can be reduced, thereby improving compression efficiency.

Figure 21:
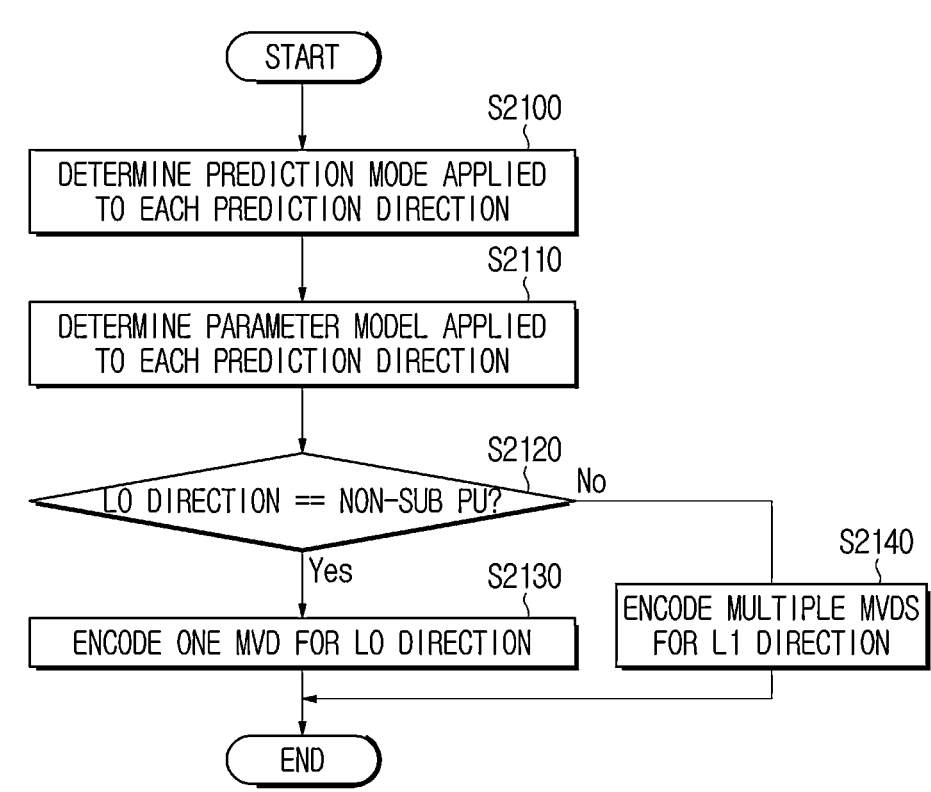
FIG. 21 is a flowchart illustrating an image encoding method according to another embodiment of the present disclosure.

FIG. 21 is a flowchart illustrating an image encoding method according to Embodiment 5.

Referring to FIG. 21, the image encoding apparatus 100 may determine different prediction types to be applied to each prediction direction of the current block (S2100). For example, the image encoding apparatus 100 may determine the prediction type in the L0 direction to be a sub PU prediction type, and may determine the prediction type in the L1 direction to be a non-sub PU prediction type. As another example, the image encoding apparatus 100 may determine the prediction type in the L0 direction to be a non-sub PU prediction type, and may determine the prediction type in the L1 direction to be a sub PU prediction type. Information on the determination of the prediction type may be encoded and signaled as second information (inter_mixed_pu_10_flag).

The image encoding apparatus 100 may determine a parameter model to be applied to each prediction direction. The parameter model may include a translational motion model, a 4-parameter model (e.g., a 4-parameter affine motion model), and a 6-parameter model (e.g., a 6-parameter affine motion model). Information about the parameter model may be encoded and signaled as third information (cu_subpu_type_flag).

The image encoding apparatus 100 may determine the prediction type applied to each prediction direction (S2120) and signal the MVD for each prediction direction based on the determination (S2130, S2140). For example, if the non-sub PU prediction type is applied to the L0 direction and the sub PU prediction type is applied to the L1 direction, one MVD may be encoded for the L0 direction and multiple MVDs may be encoded for the L1 direction. Here, the number of MVDs to be encoded for the prediction direction to which the sub PU prediction type is applied may be determined based on the parameter model determined through step S2110.

Figure 22:
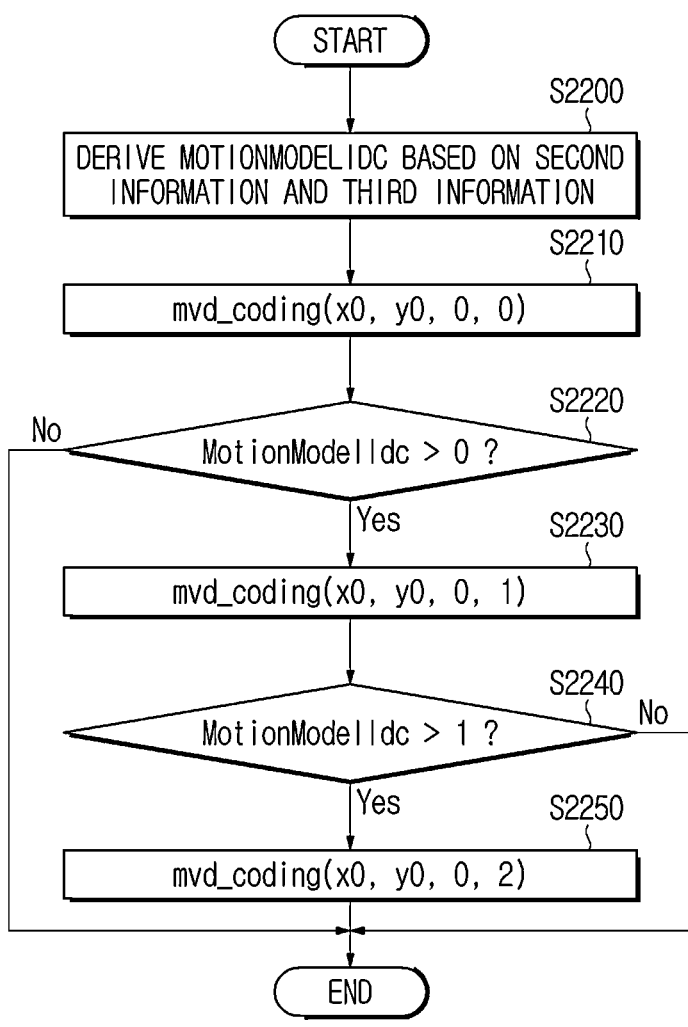
FIG. 22 is a flowchart illustrating an image decoding method according to another embodiment of the present disclosure.

FIG. 22 is a flowchart illustrating an image decoding method according to Embodiment 5.

Referring to FIG. 22, the image decoding apparatus 200 may derive a parameter model (MotionModelIdc[x][x][y]) in each prediction direction based on signaled second information (inter_mixed_pu_10_flag) and third information (cu_ subpu_type_flag) (S2200). Here, MotionModelIdc[lx][x][y] is a variable representing a motion model (parameter model) of a coding unit, and lx may represent a reference picture list direction (prediction direction).

MotionModelIdc[lx][x][y] may be derived as follows.

```
-    when    general_merge_flag=1,
MotionModelIdc[lx][x][y]=merge_subblock_flag[x0][y0] for lx=0, 1
  - otherwise (general_merge_flag=0),
  - when inter_mixed_pu_flag=1,
    MotionModelIdc[0][x][y]=inter_mixed_pu_10_flag[x0][y0]              ?
cu_subpu_type_flag[x0][y0] + 1 : 0
    MotionModelIdc[1][x][y]=inter_mixed_pu_10_flag[x0][y0]     ?    0    :
cu_subpu_type_flag[x0][y0] + 1
  - when inter_mixed_pu_flag=1,
    Motion ModelIdc[lx][x][y]=inter_affine_flag[x0][y0] + cu_affine_type_flag[x0][y0]
for lx = 0, 1
```

The parameter model indicated by MotionModelIdc[lx][x][y] is shown in Table 18.

TABLE 18

| MotionModelIdc[ 1x ][ x ][ y ] | Motion model for motion compensation |
| --- | --- |
| 0 | Translational motion model |
| 1 | 4-parameter affine motion model |
| 2 | 6-parameter affine motion model |

Since different prediction types are applied to each prediction direction, MotionModelIdc may represent different values for each prediction direction. In addition, since the proposed method is applied when inter_mixed_pu_flag=1, a rameter model (MotionModelIdc>0), the image decoding apparatus 200 may additionally perform mvd_coding to obtain a second MVD (S2230). In contrast, if MotionModelIdc=0, additional mvd_coding may not be performed.

The image decoding apparatus 200 may additionally check the value of MotionModelIdc (S2240). As a result, if the value of MotionModelIdc indicates a 6-parameter model (MotionModelIdc>1), the image decoding apparatus 200 may additionally perform mvd_coding to obtain a third MVD (S2250). In contrast, if MotionModelIdc=1, additional mvd_coding may not be performed.

The method described above for adaptive encoding and obtaining of MVD is expressed in a syntax structure as shown in Table 19.

TABLE 19

```
if( sps_smvd_enabled_flag && !ph_mvd_l1_zero_flag &&
    inter_pred_idc[ x0 ][ y0 ] = = PRED_BI
&& !inter_affine_flag[ x0 ][ y0 ] && RefIdxSymL0 > −1 && RefIdxSymL1
> −1 )
sym_mvd_flag[ x0 ][ y0 ]                                                    ae(v)
if( inter_pred_idc[ x0 ][ y0 ] != PRED_L1 ) {
if( NumRefIdxActive[ 0 ] > 1 && !sym_mvd_flag[ x0 ][ y0 ] )
ref_idx_l0[ x0 ][ y0 ]                                                      ae(v)
mvd_coding( x0, y0, 0, 0 )
if( MotionModelIdc[ 0 ][ x0 ][ y0 ] > 0 )
mvd_coding( x0, y0, 0, 1 )
if(MotionModelIdc[ 0 ][ x0 ][ y0 ] > 1 )
mvd_coding( x0, y0, 0, 2 )
mvp_l0_flag[ x0 ][ y0 ]                                                     ae(v)
} else {
MvdL0[ x0 ][ y0 ][ 0 ] = 0
MvdL0[ x0 ][ y0 ][ 1 ] = 0
}
if( inter_pred_idc[ x0 ][ y0 ] != PRED_L0 ) {
if( NumRefIdxActive[ 1 ] > 1 && !sym_mvd_flag[ x0 ][ y0 ] )
ref_idx_l1[ x0 ][ y0 ]                                                      ae(v)
if( ph_mvd_l1_zero_flag && inter_pred_idc[ x0 ][ y0 ] = = PRED_BI ) {
MvdL1[ x0 ][ y0 ][ 0 ] = 0
MvdL1[ x0 ][ y0 ][ 1 ] = 0
MvdCpL1[ x0 ][ y0 ][ 0 ][ 0 ] = 0
MvdCpL1[ x0 ][ y0 ][ 0 ][ 1 ] = 0
MvdCpL1[ x0 ][ y0 ][ 1 ][ 0 ] = 0
MvdCpL1[ x0 ][ y0 ][ 1 ][ 1 ] = 0
MvdCpL1[ x0 ][ y0 ][ 2 ][ 0 ] = 0
MvdCpL1[ x0 ][ y0 ][ 2 ][ 1 ] = 0
} else {
if( sym_mvd_flag[ x0 ][ y0 ] ) {
MvdL1[ x0 ][ y0 ][ 0 ] = −MvdL0[ x0 ][ y0 ][ 0 ]
MvdL1[ x0 ][ y0 ][ 1 ] = −MvdL0[ x0 ][ y0 ][ 1 ]
} else
mvd_coding( x0, y0, 1, 0 )
if( MotionModelIdc[ 1 ][ x0 ][ y0 ] > 0 )
mvd_coding( x0, y0, 1, 1 )
if(MotionModelIdc[ 1 ][ x0 ][ y0 ] > 1 )
mvd_coding( x0, y0, 1, 2 )
}
mvp_l1_flag[ x0 ][ y0 ]                                                     ae(v)
} else {
MvdL1[ x0 ][ y0 ][ 0 ] = 0
MvdL1[ x0 ][ y0 ][ 1 ] = 0
}
``` first array of MotionModelIdc may be defined to represent each prediction direction in order to define each prediction direction.

The image decoding apparatus 200 may perform mvd_coding for each prediction direction to obtain MVDs for each prediction direction (S2210 to S2250).

Specifically, the image decoding apparatus 200 may perform mvd_coding to obtain a first MVD (S2210) and check the value of MotionModelIdc (S2220). If the value of MotionModelIdc indicates a 4-parameter model or a 6-pa- In mvd_coding (x0, y0, lx, n) of Table 19, lx represents a prediction direction, and n represents the number of times mvd_coding is performed.

The image decoding apparatus 200 may derive bidirectional motion information of a current block based on any one of at least one bidirectional motion information candidate and the MVD obtained for each prediction direction. In addition, the image decoding apparatus may perform bidirectional prediction based on the derived bidirectional motion information.

Figure 23:
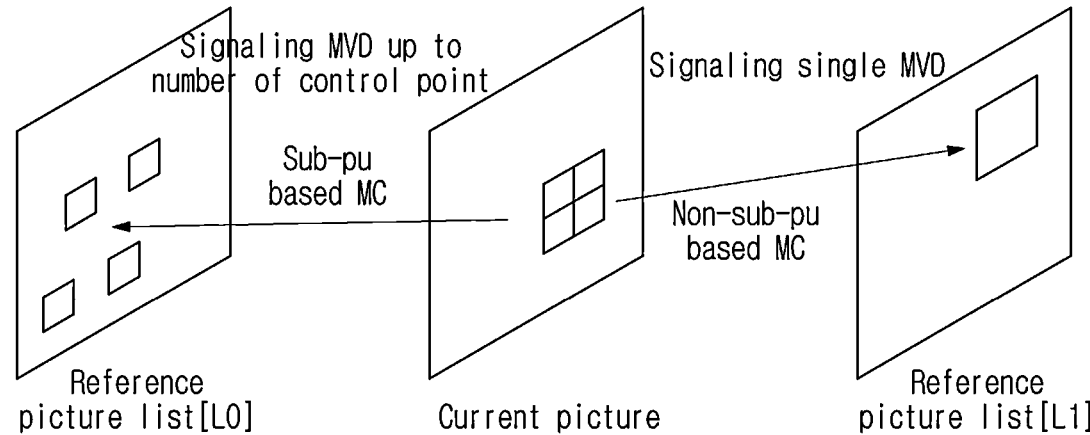
FIG. 23 is a diagram for explaining an example of signaling of a motion vector difference according to the present disclosure.

An example of bi-predicting a current block based on different prediction types using adaptively signaled MVDs is shown in FIG. 23. In FIG. 23, since the L0 direction is of a sub PU prediction type, multiple MVDs (e.g., as many as the number of CPs) may be signaled, and since the L1 direction is of a non-sub prediction type, a single MVD may be signaled.

Embodiment 6

Embodiment 6 is an embodiment of various positions of reference blocks.

FIG. 24 is a diagram for explaining various positions of reference blocks that may derive motion information in more detail. As illustrated in FIG. 24, reference blocks may include blocks adjacent to a current block and blocks that are not adjacent to the current block.

Accordingly, the image encoding apparatus 100 and the image decoding apparatus 200 may refer to not only the motion information of blocks adjacent to the current block but also the motion information of blocks that are not adjacent to the current block, thereby deriving the motion information of the current block in more detail.

Figure 25:
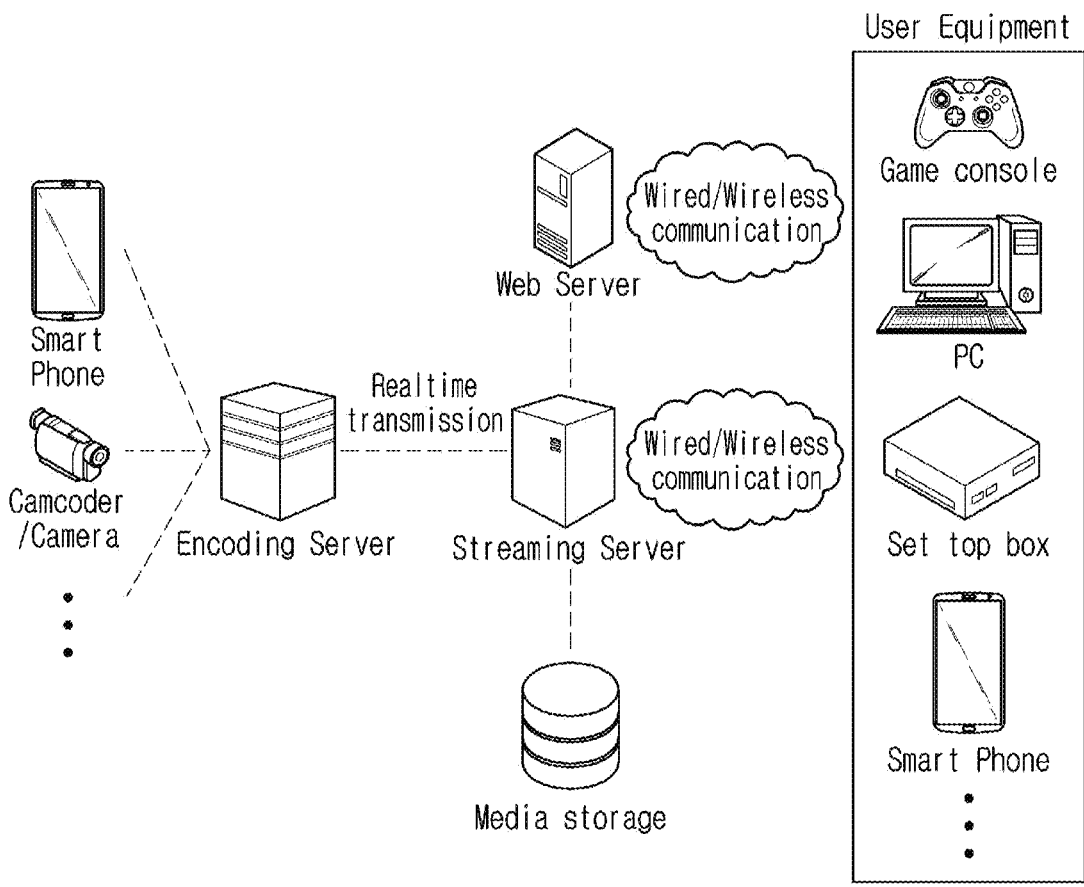
FIG. 25 is a view showing a content streaming system to which an embodiment of the present disclosure is applicable.

FIG. 25 is a view showing a content streaming system, to which an embodiment of the present disclosure is applicable.

As shown in FIG. 25, the content streaming system, to which the embodiment of the present disclosure is applied, may largely include an encoding server, a streaming server, a web server, a media storage, a user device, and a multi-media input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus, the image decoding method comprising:

obtaining first information based on a prediction direction of a current block being bidirectional;

deriving at least one bidirectional motion information candidate corresponding to different prediction types from reference blocks, based on the first information specifying that the different prediction types are applied to each prediction direction of the current block; and bi-predicting the current block with the different prediction types, based on any one of the at least one bidirectional motion information candidate, wherein the different prediction types are a sub-block unit (sub PU) prediction type and a non-sub-block unit (non-sub PU) prediction type.

2. The image decoding method of claim 1, wherein the bidirectional motion information candidate is derived based on motion information including at least one sub PU based motion information among bidirectional motion information of the reference blocks, and wherein the sub PU based motion information is motion information used for the sub PU prediction type.

3. The image decoding method of claim 1, wherein the bidirectional motion information candidate is derived based on motion information including at least one sub PU based motion information among motion information in which motion information of the reference blocks is combined on a prediction direction basis, and wherein the sub PU based motion information is motion information used for the sub PU prediction type.

4. The image decoding method of claim 3, wherein the combined motion information is derived based on prediction directions of the reference blocks being unidirectional.

5. The image decoding method of claim 1, wherein the reference blocks include neighboring blocks located around the current block and predetermined adjacent blocks adjacent to the current block, and wherein, based on a prediction mode of the predetermined adjacent blocks being the non-sub PU prediction type, the bidirectional motion information candidate is derived based on motion information in which motion information of the neighboring blocks is combined on a prediction direction basis.

6. The image decoding method of claim 1, wherein the obtaining comprises:

determining a first condition on whether the current block is bi-predicted with the different prediction types; and obtaining the first information based on the first condition being satisfied, wherein the first condition comprises a condition on the prediction direction of the current block and a predetermined size condition on a size of the current block.

7. The image decoding method of claim 1, wherein the first condition further comprises a condition on whether a motion vector difference (mvd) in a specific direction of both directions is signaled.

8. The image decoding method of claim 1, comprising obtaining second information based on the first information specifying that different prediction types are applied to each prediction direction of the current block, wherein the different prediction types applied to each prediction direction are determined based on the second information, and wherein the bidirectional motion information candidate corresponds to the determined different prediction types.

9. The image decoding method of claim 1, wherein the first information further specifies different prediction types applied to each prediction direction.

10. The image decoding method of claim 8, comprising obtaining third information based on the first information specifying that different prediction types are applied to each prediction direction of the current block, wherein a parameter model applied to each prediction direction is determined based on the third information.

11. The image decoding method of claim 10, wherein bidirectional motion information of the current block is derived based on any one of the at least one bidirectional motion information candidate and mvd obtained for each prediction direction of the current block, and wherein a number of mvds obtained for each prediction direction of the current block is determined based on the second information and the third information.

12. The image decoding method of claim 1, wherein one mvd is obtained for a direction, to which a non-sub PU based prediction mode is applied, among prediction directions of the current block.

13. The image decoding method of claim 1, wherein the first information is obtained based on a subblock merge mode being applied to the current block or an affine prediction mode being applied to the current block.

14. An image encoding method performed by an image encoding apparatus, the image encoding method comprising:

determining whether different prediction types are applied to each prediction direction of a current block based on a prediction direction of the current block being bidirectional, first information specifying that different prediction types being applied to each prediction direction of the current block being encoded into a bitstream;

deriving at least one bidirectional motion information candidate corresponding to the different prediction types from reference blocks, based on the different prediction types being applied to each prediction direction of the current block; and bi-predicting the current block with the different prediction types based on any one of the at least one bidirectional motion information candidate, wherein the different prediction types are a sub-block unit (sub PU) prediction type and a non-sub-block unit (non-sub PU) prediction type.

15. A method of transmitting a bitstream generated by an image encoding method, the image encoding method comprising:

determining whether different prediction types are applied to each prediction direction of a current block based on a prediction direction of the current block being bidirectional, first information specifying that different prediction types being applied to each prediction direction of the current block being encoded into the bitstream;

deriving at least one bidirectional motion information candidate corresponding to the different prediction types from reference blocks, based on the different prediction types being applied to each prediction direction of the current block; and bi-predicting the current block with the different prediction types based on any one of the at least one bidirectional motion information candidate, wherein the different prediction types are a sub-block unit (sub PU) prediction type and a non-sub-block unit (non-sub PU) prediction type.

* * * * *